Dec. 6, 1955

W. W. LANDSIEDEL 2,726,037

SHORT-CUT MULTIPLICATION MECHANISM

Filed May 12, 1949

INVENTOR
WALTER W. LANDSIEDEL
BY
ATTORNEY

Dec. 6, 1955
W. W. LANDSIEDEL
2,726,037
SHORT-CUT MULTIPLICATION MECHANISM
Filed May 12, 1949
19 Sheets-Sheet 2
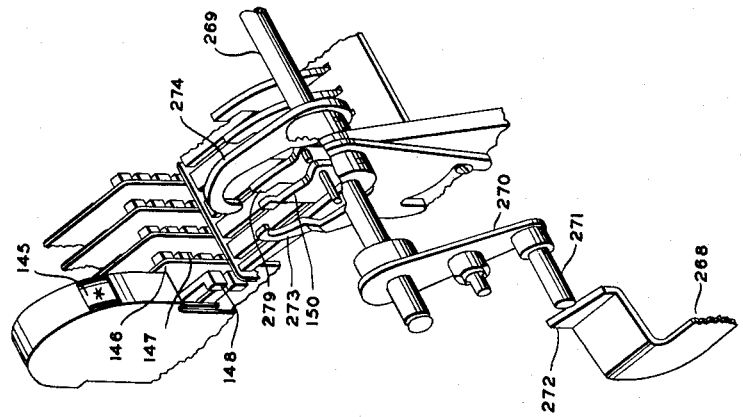
FIG. 2
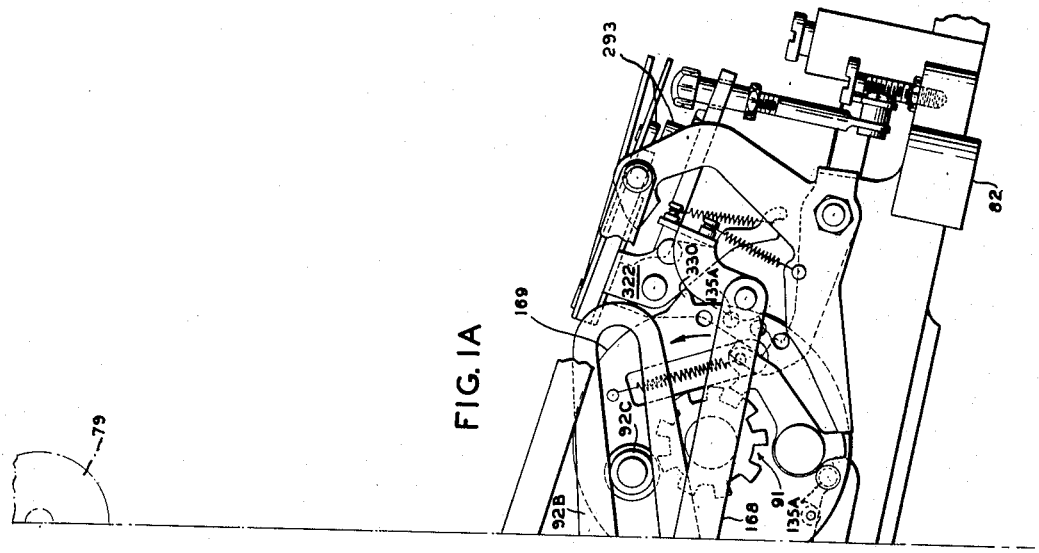
FIG. IA
INVENTOR
WALTER W. LANDSIEDEL
BY
ATTORNEY Dec. 6, 1955  W. W. LANDSIEDEL  2,726,037
SHORT-CUT MULTIPLICATION MECHANISM
Filed May 12, 1949  19 Sheets-Sheet 3

INVENTOR
WALTER W. LANDSIEDEL
BY
ATTORNEY

Dec. 6, 1955  W. W. LANDSIEDEL  2,726,037
SHORT-CUT MULTIPLICATION MECHANISM
Filed May 12, 1949  19 Sheets-Sheet 4

INVENTOR
WALTER W. LANDSIEDEL
BY
ATTORNEY

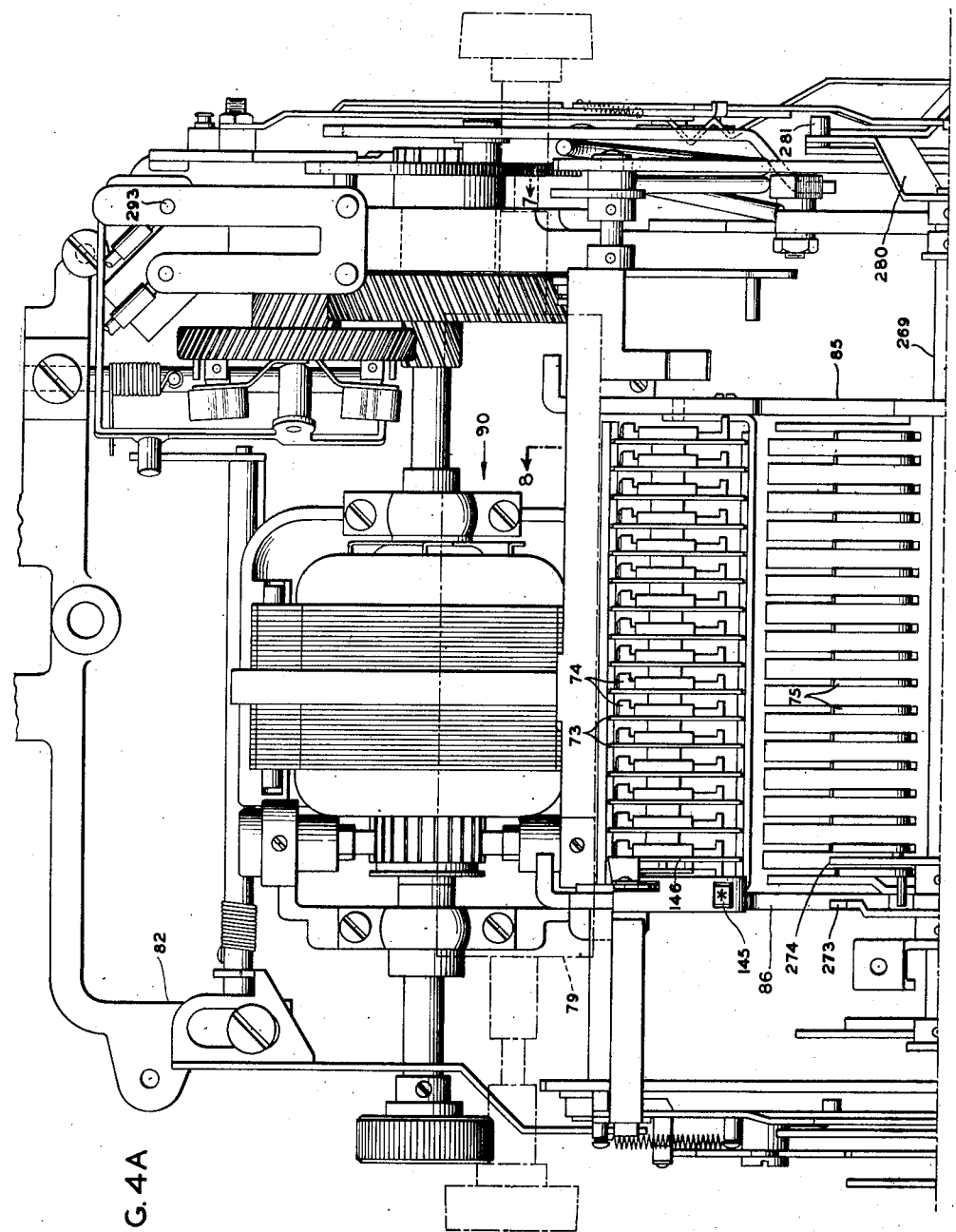

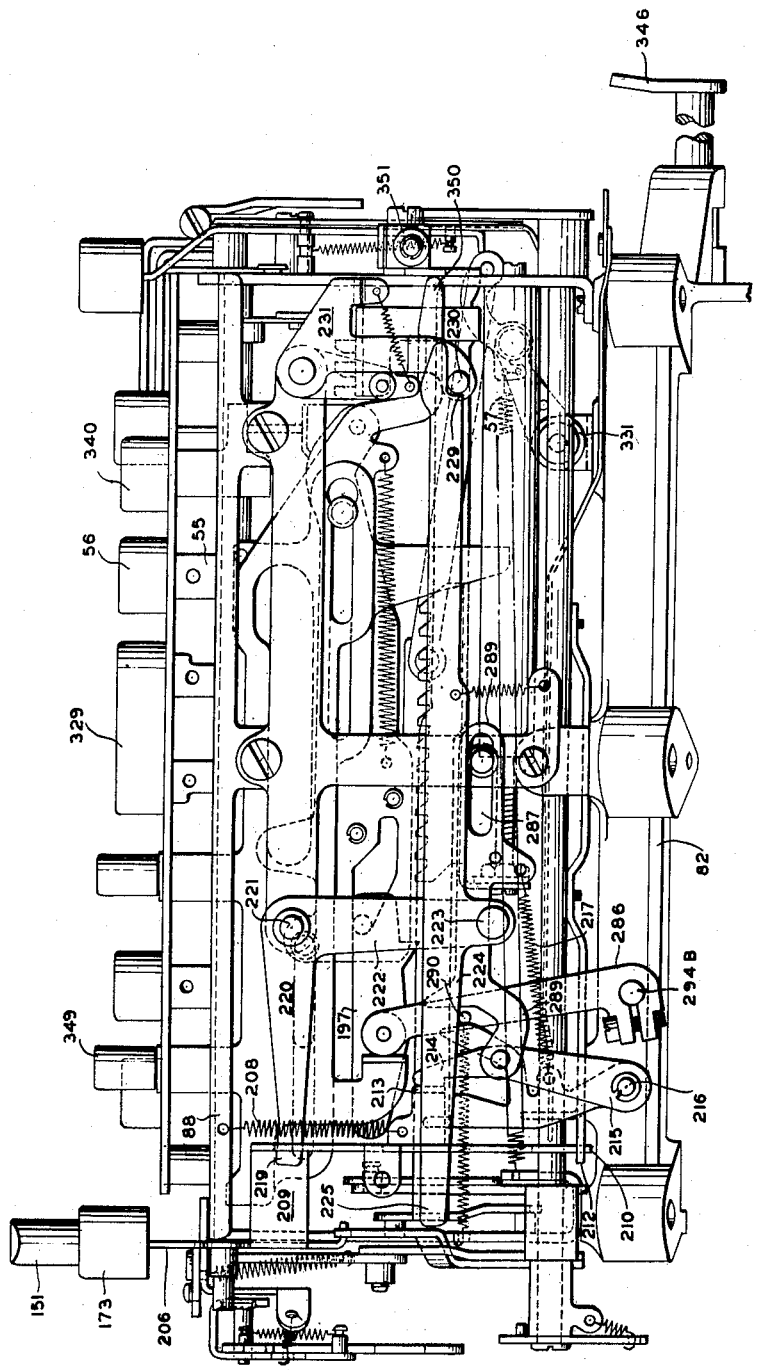

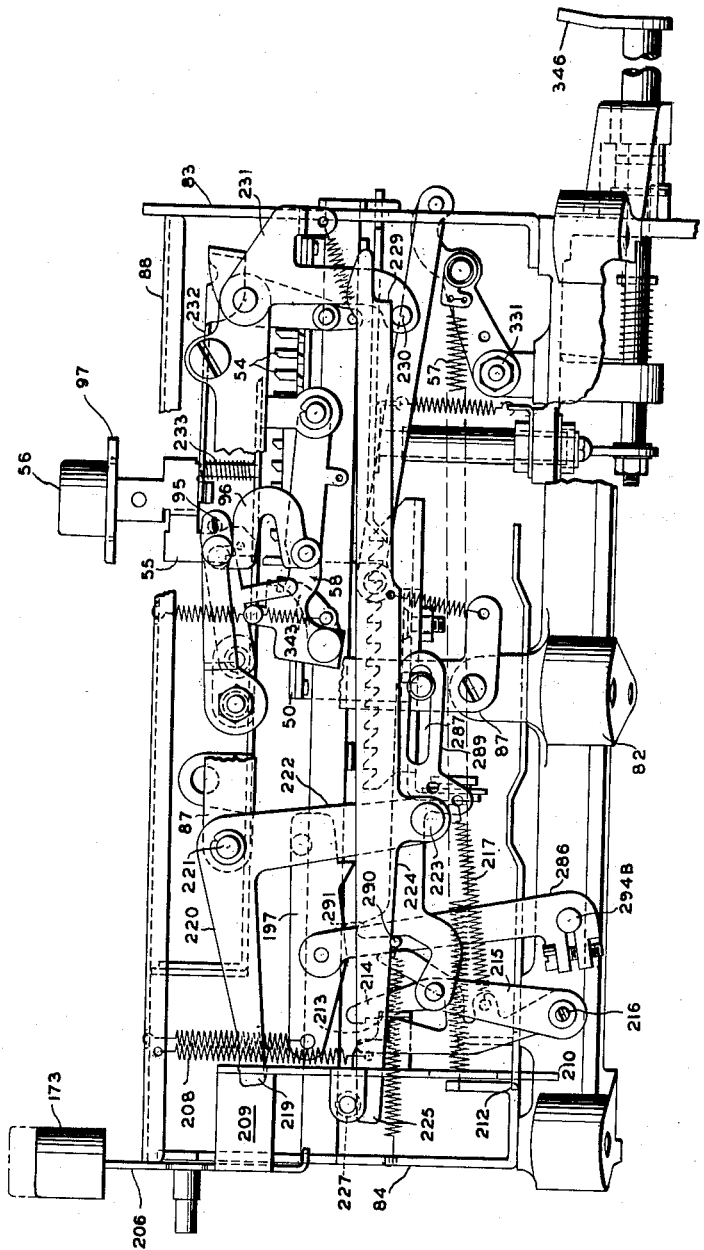

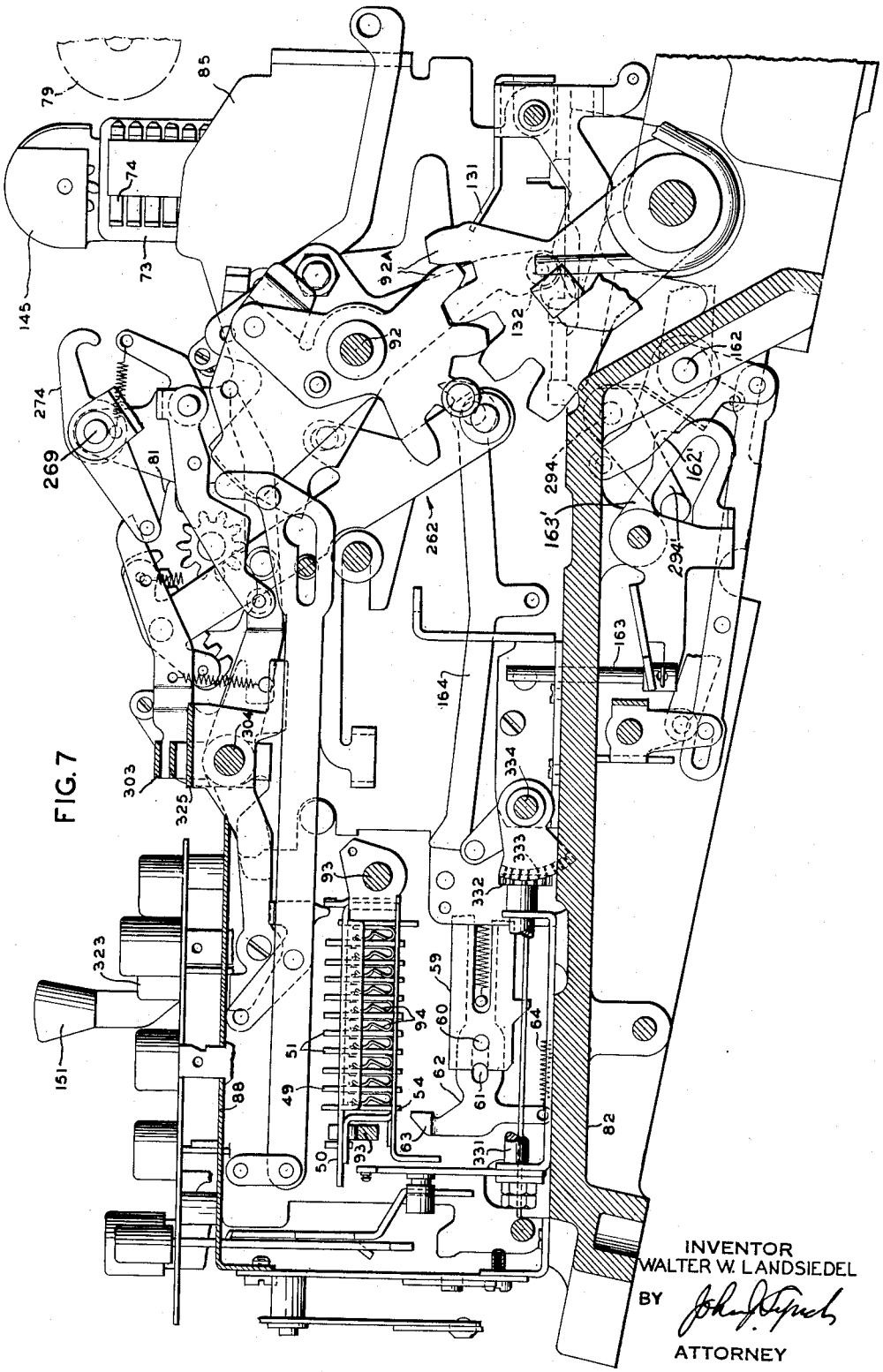

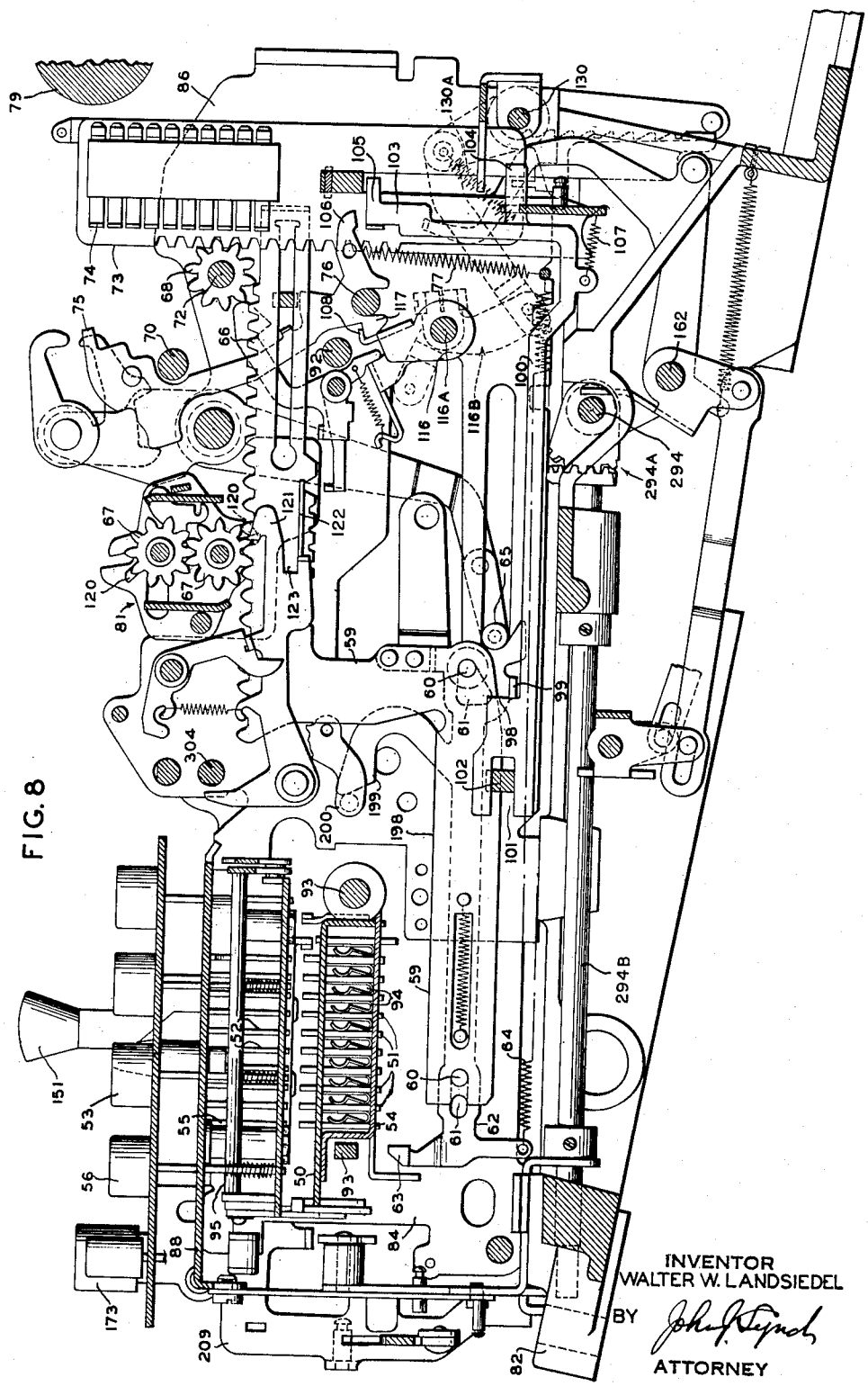

Dec. 6, 1955  W. W. LANDSIEDEL  2,726,037
SHORT-CUT MULTIPLICATION MECHANISM
Filed May 12, 1949  19 Sheets-Sheet 10

INVENTOR
WALTER W. LANDSIEDEL
BY John J. Lynch
ATTORNEY

Dec. 6, 1955  W. W. LANDSIEDEL  2,726,037
SHORT-CUT MULTIPLICATION MECHANISM
Filed May 12, 1949  19 Sheets-Sheet 12

INVENTOR
WALTER W. LANDSIEDEL

BY *John J. Lipschutz*
ATTORNEY

Dec. 6, 1955  W. W. LANDSIEDEL  2,726,037
SHORT-CUT MULTIPLICATION MECHANISM
Filed May 12, 1949  19 Sheets-Sheet 13

INVENTOR
WALTER W. LANDSIEDEL
BY
ATTORNEY

Dec. 6, 1955  W. W. LANDSIEDEL  2,726,037
SHORT-CUT MULTIPLICATION MECHANISM
Filed May 12, 1949  19 Sheets-Sheet 14

INVENTOR
WALTER W. LANDSIEDEL
BY
ATTORNEY

Dec. 6, 1955  W. W. LANDSIEDEL  2,726,037
SHORT-CUT MULTIPLICATION MECHANISM
Filed May 12, 1949                             19 Sheets-Sheet 15
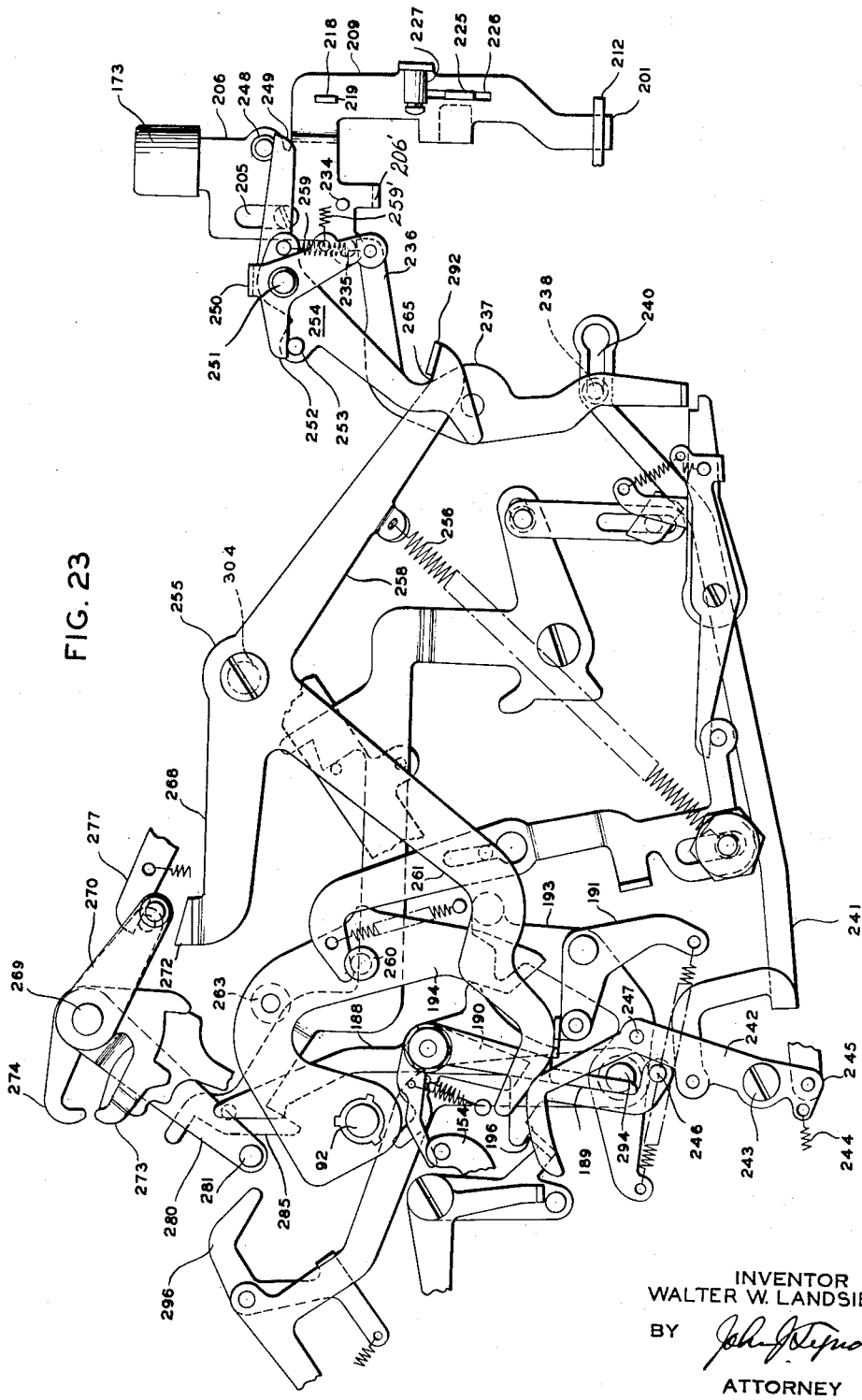
FIG. 23
INVENTOR
WALTER W. LANDSIEDEL
BY 
ATTORNEY Dec. 6, 1955  W. W. LANDSIEDEL  2,726,037
SHORT-CUT MULTIPLICATION MECHANISM
Filed May 12, 1949  19 Sheets-Sheet 16
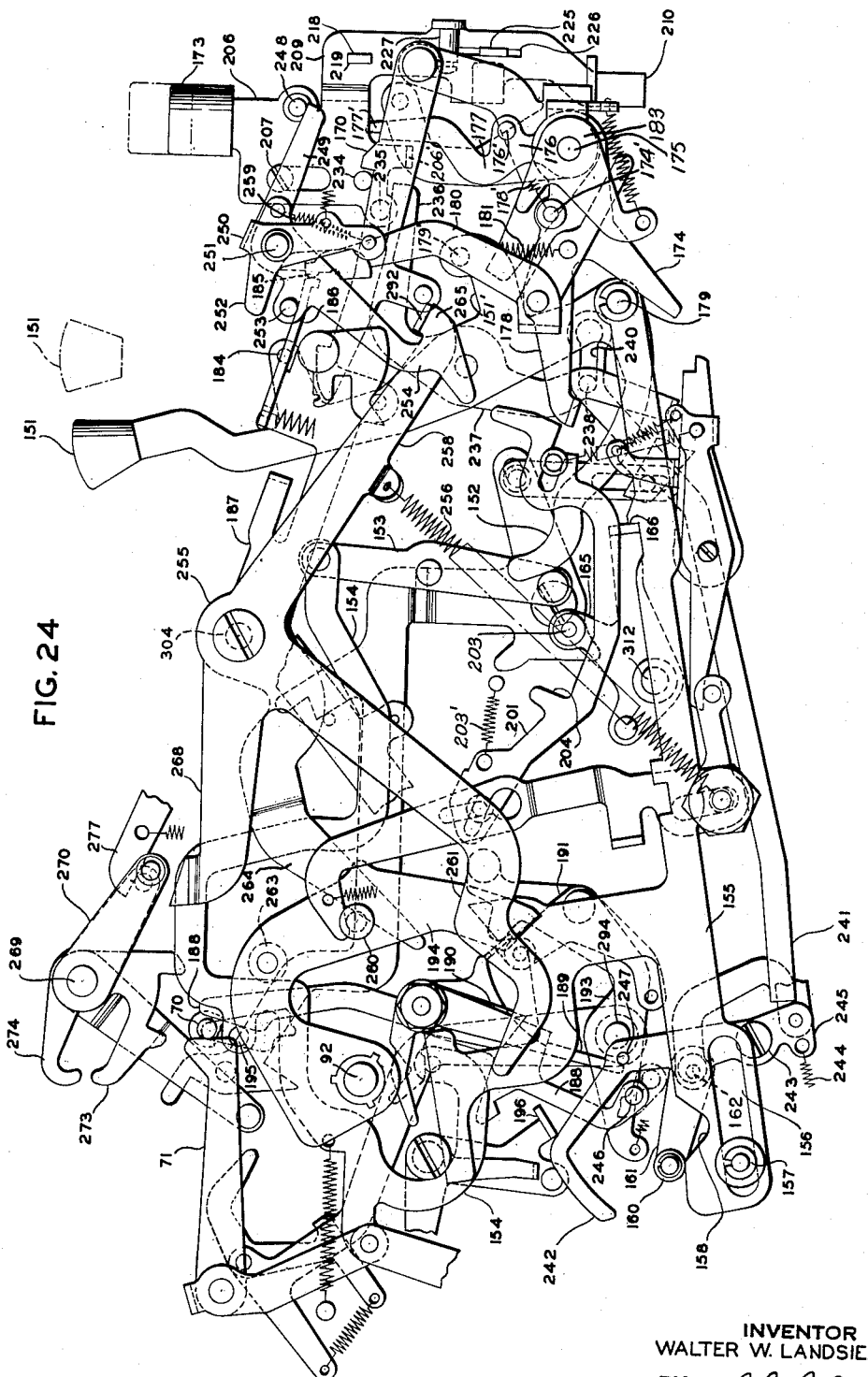
FIG. 24
INVENTOR
WALTER W. LANDSIEDEL
BY 
ATTORNEY Dec. 6, 1955  W. W. LANDSIEDEL  2,726,037
SHORT-CUT MULTIPLICATION MECHANISM
Filed May 12, 1949  19 Sheets-Sheet 17

INVENTOR
WALTER W. LANDSIEDEL
BY John J. Lynch
ATTORNEY

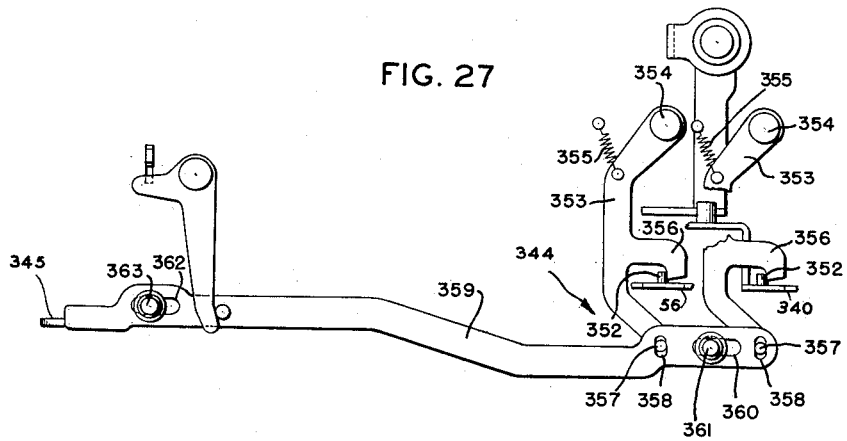
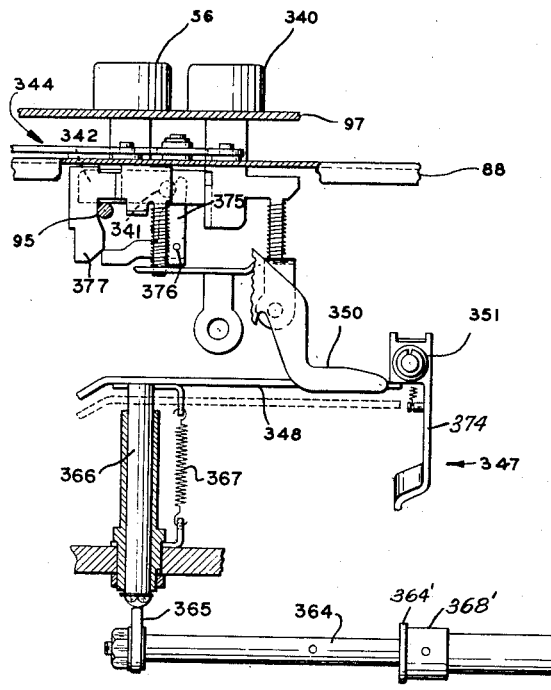
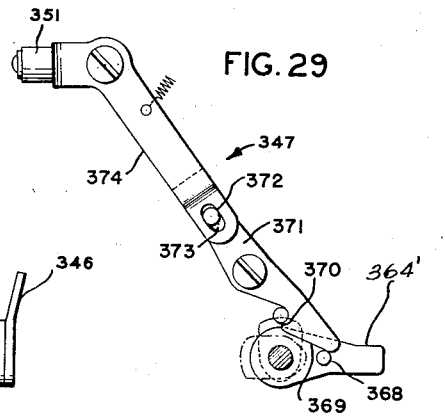

Dec. 6, 1955                    W. W. LANDSIEDEL                    2,726,037
                        SHORT-CUT MULTIPLICATION MECHANISM
Filed May 12, 1949                                              19 Sheets-Sheet 19
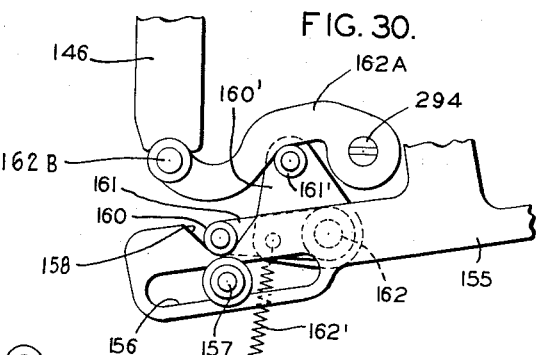
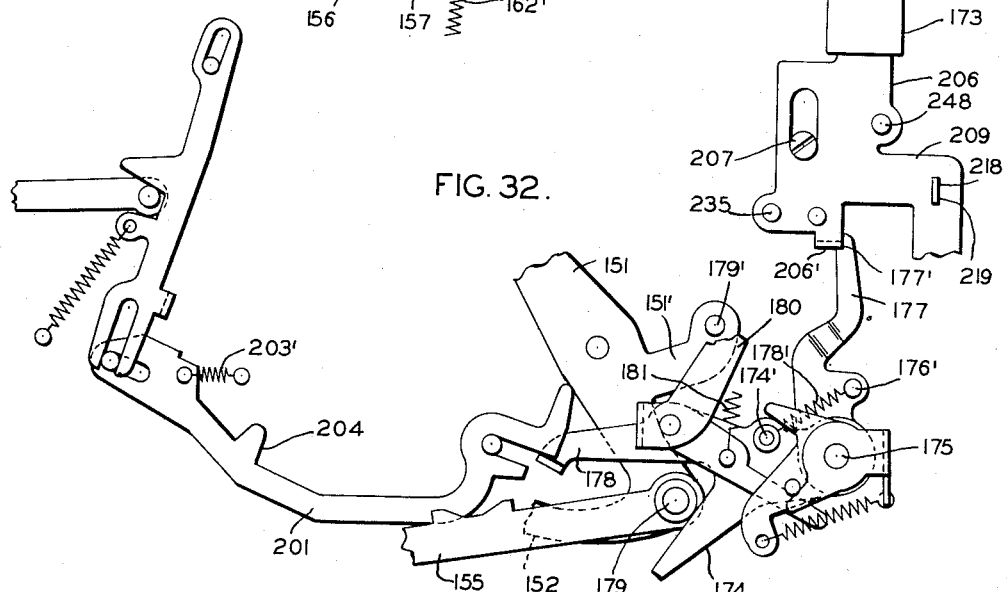
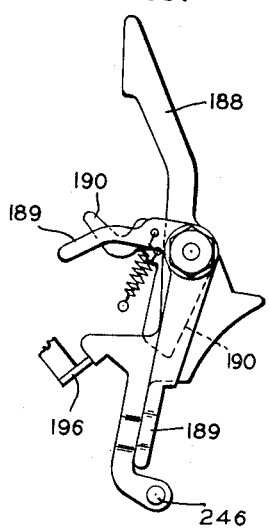
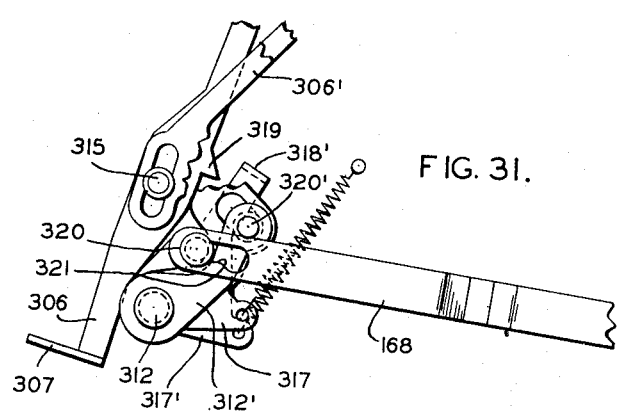
INVENTOR.
WALTER W. LANDSIEDEL
BY
John J. Lynch
ATTORNEY

United States Patent Office 2,726,037
Patented Dec. 6, 1955

2,726,037

SHORT-CUT MULTIPLICATION MECHANISM

Walter W. Landsiedel, Elmira, N. Y., assignor, by mesne assignments, to Sperry Rand Corporation, New York, N. Y., a corporation of Delaware Application May 12, 1949, Serial No. 92,814

6 Claims. (Cl. 235—60.31)

This invention relates to calculating machines, and more particularly to a calculating machine wherein addition, subtraction, division, regular multiplication, short cut and discount multiplication problems may be performed and wherein the essential factors of such problems may be printed without the printing of unnecessary ciphers.

The particular machine wherein the invention is embodied is an improvement upon the machine disclosed in U. S. Patent No. 2,688,439, issued September 7, 1954, and it further improves upon those machines set forth in the earlier Patents Nos. 2,237,881, 2,255,622, 2,203,336, 2,229,980, and upon that described in P tent No. 1,899,444 of Mehan.

Certain subject matter described and shown in this application but not claimed, is shown, described, and claimed in the following copending divisional applications:

Serial Number 378,151, filed September 2, 1953, entitled "Print Suppression Mechanism for Calculating Machines," and Serial Number 378,152, filed September 2, 1953, and entitled "Type and Add Rack Mechanism for Calculating Machines."

In the present application the machine disclosed, while retaining the basic features of construction of the earlier patents set forth above, has incorporated integrally therein novel mechanism which not only enables the machine to perform operations of which it has not heretofore been capable, but which also enables the machine to perform its various operations in a faster and more efficient manner with the elimination of unnecessary movement of various parts and consequently with a considerable decrease in wear and tear on such parts.

Through new mechanism and novel arrangement of parts incorporated therein the calculator improves upon the earlier machines in a number of ways: It has an increased capacity of operation; it is capable of short cut and discount multiplication; it eliminates the unnecessary movement of the type racks on non-print cycles in multiplication and division problems; it provides mechanism for preventing the printing of meaningless ciphers particularly in multiplication and division problems; it eliminates slamming and jumping of the type racks on totaling operations; it provides for a faster carry operation. In general it is an improved computing and printing machine that, as an integral unit, calculates faster and with less noise, vibration and movement of parts than the earlier machines.

The machine by way of example, is a 13 column listing calculator with a 14 column total capacity. This increased capacity permits a multiplicand of seven digits to be multiplied by a multiplier of seven digits. It also offers a larger division capacity, and will allow split multiplication or addition. Split multiplication is used when it is desired to multiply two separate and distinct multiplicands by a common multiplier.

In earlier machines, ciphers added in the setting up of multiplication and division problems, were printed along with the factors of the problem on the tally sheet. The present calculator does not print these ciphers in either a multiplication or division problem. This has been brought about by adding an extra row of space stops. These are used in place of the ciphers formerly added in the setting up of such problems. A row of these space stops has been added in front of the zero stops in the stop section of the machine. Novel mechanism cooperating with the adding racks and the space stops blocks the firing of the print hammers when the space stops have been depressed. These stops are depressed by a space key and may be inserted individually or by depressing the space key and constant key simultaneously.

In the earlier calculators mentioned the type racks went through a customary up and down movement with each cycle of the machine. This unnecessary movement is eliminated by improved mechanism in the present machine wherein the type racks are in disconnected position from the adding racks on all non-print operations and also when the adding racks are in carry position. This has been accomplished through elimination of the last three teeth from the adding racks and by means of laterally shiftable type rack operating gears. By sliding such type rack operating gears in and out of mesh with the adding racks the type racks may be engaged with and disengaged from the adding racks. These improvements permit faster non-print operations, faster carrying, eliminate unnecessary movement of the parts and reduce noise and vibration. Latching means is also provided for holding the type racks down while in disengaged position in order to prevent any possible jumping of the type racks on carry operations.

Another improvement concerned with the adding racks has been made to eliminate noise and slamming of the adding racks. On totaling operations where the accumulators are lifted from the adding racks after the print hammers have fired there is a tendency of the adding racks to slam toward the rear of the machine. This tendency is eliminated by means of retaining pawls which latch into notches provided in the adding racks to restrain the racks from such rearward movement.

Division and regular multiplication are performed in the same manner as set forth in the U. S. Patent No. 2,688,439 above referred to. However, in the present calculator, meaningless ciphers replaced in this machine by spaces are not printed.

Reference is made to the manner in which regular multiplication is performed as distinguished from short cut multiplication later to be described. Regular multiplication, as in earlier patents, is performed on this machine by the automatic repeated addition of a multiplicand into the accumulator. U. S. Patent No. 2,688,439 improved upon the multiplication mechanism of the earlier machines by eliminating several steps of operation. My present application goes further in that unnecessary ciphers are not printed during multiplication, the multiply operation is performed without movement of the type racks on non-print operations and is performed, through the elimination of such unnecessary movements, in a faster and quieter manner.

In performing a regular multiplication problem, on the present calculator, the accumulator is first cleared of any figures that may have been left set up therein. A multiplicand is then entered into the keyboard upon depression of the digit keys. This action sets up stops or pins in a movable pin carriage in consecutive denominational columns as the pin carriage moves leftward transversely of the machine. A number of spaces, one less than the number of digits in the multiplier, are added to the multiplicand through depression of a space stop key.

For example, in a problem where the multiplicand is 49765 and the multiplier is 3278, the quantity 49765 is entered into the keyboard upon depression of the digit keys. Three spaces are then added to it by depression of the space stop key. Each depression of the space stop key sets up a space stop in the pin carriage and causes the pin carriage to move leftward to its next higher denominational order. Each space stop depressed in effect increases the value of the multiplicand ten times. The multiply lever is then pushed rearward causing the machine to cycle, and it is held rearward until the number represented by the first multiplier digit, which in the above problem is 3, appears on a visible dial counter. The multiply lever is then released to its original position. After restoration of the multiply lever the machine automatically operates for an extra cycle on which cycle the machine prints the multiplier "3" and the entire multiplicand, but unlike previous machines the added ciphers, now replaced by space stops, are not printed. On this extra cycle, after printing takes place, the multiplicand is again added into the accumulator, the dial counter advanced to "4" to indicate the fourth cycle of the machine, and the pin carriage back-spaced one step which has the effect of decreasing the multiplicand contained therein by one space stop or to one tenth of its value. This fourth or extra cycle is an add cycle required to make up for the first cycle, which is a non-add cycle, so that the machine will have actually added 3 times as required for the "3" multiplier. The dial counting mechanism is identical to that detailed in Patent No. 2,237,881.

The multiply lever as above is held rearward for each successive digit of the multiplier with the exception of ciphers contained in the multiplier. Where a cipher digit is concerned the multiply lever is pulled forward to cycle the machine once and is then released to cause a non-add print cycle. Obviously the machine does not go through an extra cycle on a cipher operation since the dial counter is already in cipher position. On this non-add cycle the cipher multiplier digit and the multiplicand are automatically printed, and the pin carriage is automatically back-spaced one step to position it for the next multiplier digit. After the required cycling of the machine for the last digit of the multiplier, the machine automatically runs on to total, print the product and clear the machine for the next problem.

The present machine is capable not only of regular multiplication as above, but through novel mechanism and arrangement of parts, performs multiplication problems in a short cut or negative manner. Short cut multiplication, as it is called, is not a process of automatic repeated or positive additions of a multiplicand into an accumulator as is regular multiplication, but is one of repeated subtractions from a multiplicand that has been increased ten times and added into the accumulator, and while the regular multiplication process may be employed for an entire problem, the short cut process may be used for each digit of the multiplier exceeding "5."

In performing a problem by the short cut process, the accumulator is first cleared. A multiplicand, such for example as 49765 in the problem 49765×768, is entered through the digit keys of the keyboard into the pin carriage. Two spaces are indexed behind it by depressing the space stop key twice, this being one less than the number of digits in the multiplier. Each time a space stop is set up in the pin carriage it causes the pin carriage to move leftward one space to its next higher denominational order. In effect, depression of a space stop increases the value of the multiplicand entered in the pin carriage ten times. The short cut key is then depressed. This causes a space stop to be indexed behind the multiplicand thereby increasing the value of the multiplicand ten times. Depression of the short cut key also conditions the machine for first an add operation and thereafter repeated subtract operations. The multiply lever is next pushed rearward as in regular multiplication causing the machine to cycle. The multiply lever is manually held rearward as the machine cycles and is released when the number "3" appears on the visible dial counter, "3" being the 10's complement of "7" the first digit of the multiplier in the above problem. On the first cycle the machine adds into the accumulator the multiplicand as increased upon the depression of the short cut key. The machine on the return portion of such first cycle automatically back-spaces the pin carriage one step to decrease the value of the multiplicand in the pin carriage ten times, and sets the accumulator reversing mechanism to revolve the accumulator to subtract position on the next cycle. On the next cycle of the machine the accumulator is reversed to subtract position, and the multiplicand, as decreased by back spacing the pin carriage on the previous add cycle, is subtracted from the quantity previously entered into the accumulator. Repeated subtractions automatically take place while the multiply lever is held rearward. When the ten's complement, which in this case is "3," of the first short cut multiplier digit "7" appears on the dial counter the multiply lever is manually released and restores to normal position. The machine does not stop after the restoration of the multiply lever but continues to run for an extra cycle. On this extra cycle the machine prints the multiplier digit to the left of the tally sheet and the multiplicand to the right, the machine back-spaces the pin carriage one step and with such backspace operation releases the subtract setting mechanism conditioning the machine to revolve the accumulator to positive position on the next cycle. Toward the end of the extra cycle, the dial counter turns to the numeral "4" to indicate that the 4th cycle of the machine is taking place, and on this 4th cycle the machine goes through a third subtract operation. Of the four cycles of the machine, the first was an add cycle and the last three were subtract cycles. In the event the next digit of the multiplier is another short cut multiplier, that is, over "5," calling for short cut multiplication, the short cut key is again depressed and the process repeated as above. In the event that the next multiplier digit does not exceed "5" and calls for regular multiplication, then the multiply lever is pressed rearward as in regular multiplication. After the machine has cycled for the last digit of the multiplier the machine automatically runs on to total, print the product, and to clear the machine for the next problem as in regular multiplication.

Discount multiplication, another form of multiplication, may also be performed through the novel mechanism and arrangement of parts in my improved calculator. Discount multiplication employs the regular multiplication mechanism in conjunction with the add and subtract mechanisms. A sample problem will best show this. For example, in the problem $125.75 less 35%, the quantity 12575 is first entered into the pin carriage through the keyboard. The space top key is next depressed twice to index two space stops behind the multiplicand. The number of space stops indexed is equal to the number of digits in the percentage discount. Depressing the space stop key twice causes the figure entered in the pin carriage to be increased one hundred fold. The discount key is then depressed. This latter step starts the motor for a single add cycle. On the cycling of the machine the increased invoice quantity is printed on the tally sheet and added into the accumulator. Also on such cycling of the machine the pin carriage is backspaced one step to decrease the value of the invoice figure contained therein to one tenth of its value. The next function required of the machine in discount multiplication is to subtract the invoice quantity, in this case 35 times, that being the percentage discount, from the increased quantity previously rolled into the accumulator and printed on the tally sheet. This function is accomplished by depressing the subtract key to condition the machine for subtract operations. The subtract key when depressed is automatically latched in such position. With the subtract key latched in subtract position the multiply lever is pressed and held rearward, as in regular multiplication, until the first digit of the percentage discount, in this case "3," appears on the dial counter, and is then released. On the first cycle which is a non-subtract cycle the cradle revolves to subtract position. The machine then subtracts for the next two cycles and subtracts again on the extra cycle following the release of the multiply lever. On the extra cycle the discount digit 3 and the invoice quantity are printed and the carriage back-spaced. The multiply lever is again pushed rearward and held there for the required number of times for the "5" which is the final digit of the discount multiplier. Upon completion of the operation for the final digit of the discount multiplier the pin carriage restores and with it the subtract key is automatically unlatched and restored to normal. Restoration of the subtract key conditions the accumulator reversing mechanism to revolve the accumulator to positive position on the next cycle of the machine. The machine then automatically blank strokes, revolves the accumulator to positive position, totals, prints the answer and clears the machine for the next problem. The decimal printing mechanism is then positioned to print the decimal point in the final answer.

The above, it is believed, will provide a better understanding of the more detailed description to follow wherein the above improvements and other features of novelty will be described in detail.

The general object of the invention is to improve upon the structural makeup of printing calculating machines, of the type set forth in the foregoing patents, in order to provide a more efficient, durable and generally improved machine.

Another object of this invention is to enable a machine of the type herein to perform multiplication problems in a short cut manner.

An additional object of this invention is to combine, in printing calculating machines, mechanism that will enable the machine to perform discount multiplication in an efficient and rapid manner.

Other objects and structural details of the invention will be apparent from the following description when read in connection with the accompanying drawings, wherein, Fig. 1 is a view of the machine in right hand elevation disclosing the general make up of the machine in normal poistion;

Fig. 2 is a perspective view showing the dial type and dial type hammers;

Fig. 4a is a continuation of Fig. 4 and discloses the location of the motor and relative arrangement of the parts at the rearward section of the machine;

Fig. 5 is a front elevation view of the machine;

Fig. 6 is a front elevation view of the machine with parts omitted and directed to a disclosure of the portion of the short cut multiplication mechanism at the front of the machine, in operative position;

Fig. 7 is a front to rear vertical section through the machine taken just inside the right outer frame substantially on the line 7—7 of Figs, 4, 4a and showing several basic features of the machine;

Fig. 8 is a front to rear vertical section through the machine taken inside the right inner frame of the machine substantially on the line 8—8 of Figs. 4, 4a and showing further basic features of the machine;

Fig. 13 represents a section of tally sheet containing printed thereon a problem in division as done and recorded on the machine of the present invention showing the non-print of meaningless ciphers;

Fig. 14 shows the same problem as in Fig. 13 as done and recorded on a machine not having the novel mechanism for the non-printing of meaningless ciphers;

Fig. 15 represents a section of tally sheet containing printed thereon a problem in multiplication as done and recorded on the machine of the present invention showing the non-print of meaningless ciphers;

Fig. 16 shows the same problem as in Fig. 15 as done and recorded on a machine not having the novel mechanism for the non-printing of meaningless ciphers;

Fig. 23 is a detailed view of the short cut multiplication control mechanism in normal position;

Fig. 24 is a detailed view of the short cut multiplication control and the multiplication mechanism in operative position with the short cut key depressed and the multiply lever pushed rearward;

Fig. 27 is a plan view of a detail of the latching mechanism related to the constant multiplicand assembly;

Fig. 28 is an elevation view in detail of further mechanism of the constant multiplicand assembly showing the relative position of the universal bail rod and the universal bail rod stop and the stop restoring plate;

Fig. 29 is a detail view of the constant latch mechanism.

Fig. 30 is a detail view of the dial rack lifting mechanism shown in Fig. 3;

Fig. 31 is a detail view of the mechanism for lifting the multiplier link latch shown in Fig. 1;

Fig. 32 is a detail view showing the means for latching the motor bail arm and for latching the short-cut key against operation, shown in Fig. 3; and, Fig. 33 is a detail view of the back-space latches shown in Fig. 3.

Figure 1:
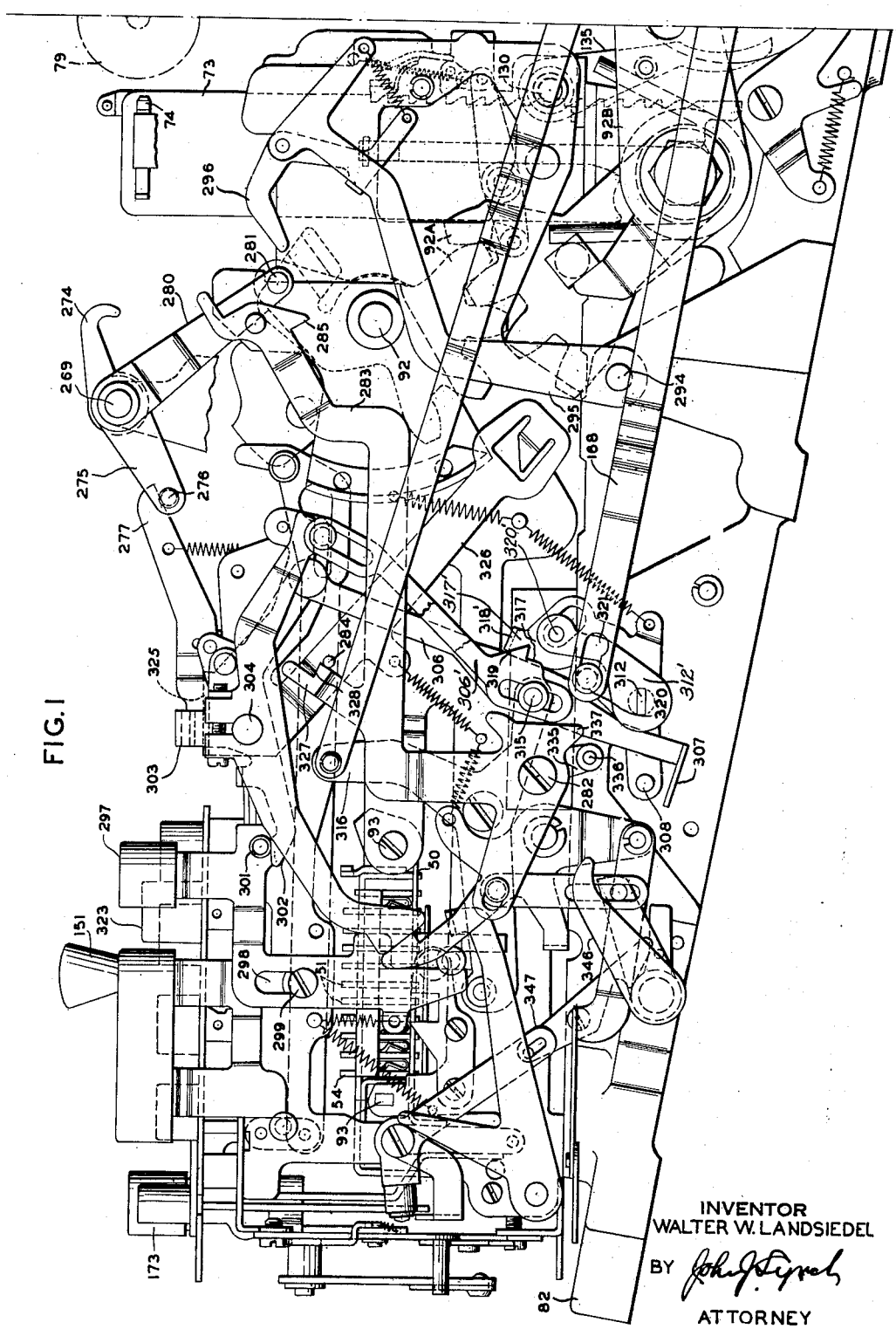
Fig. 1a is a continuation of the rear end of Fig. 1.
Figure 4:
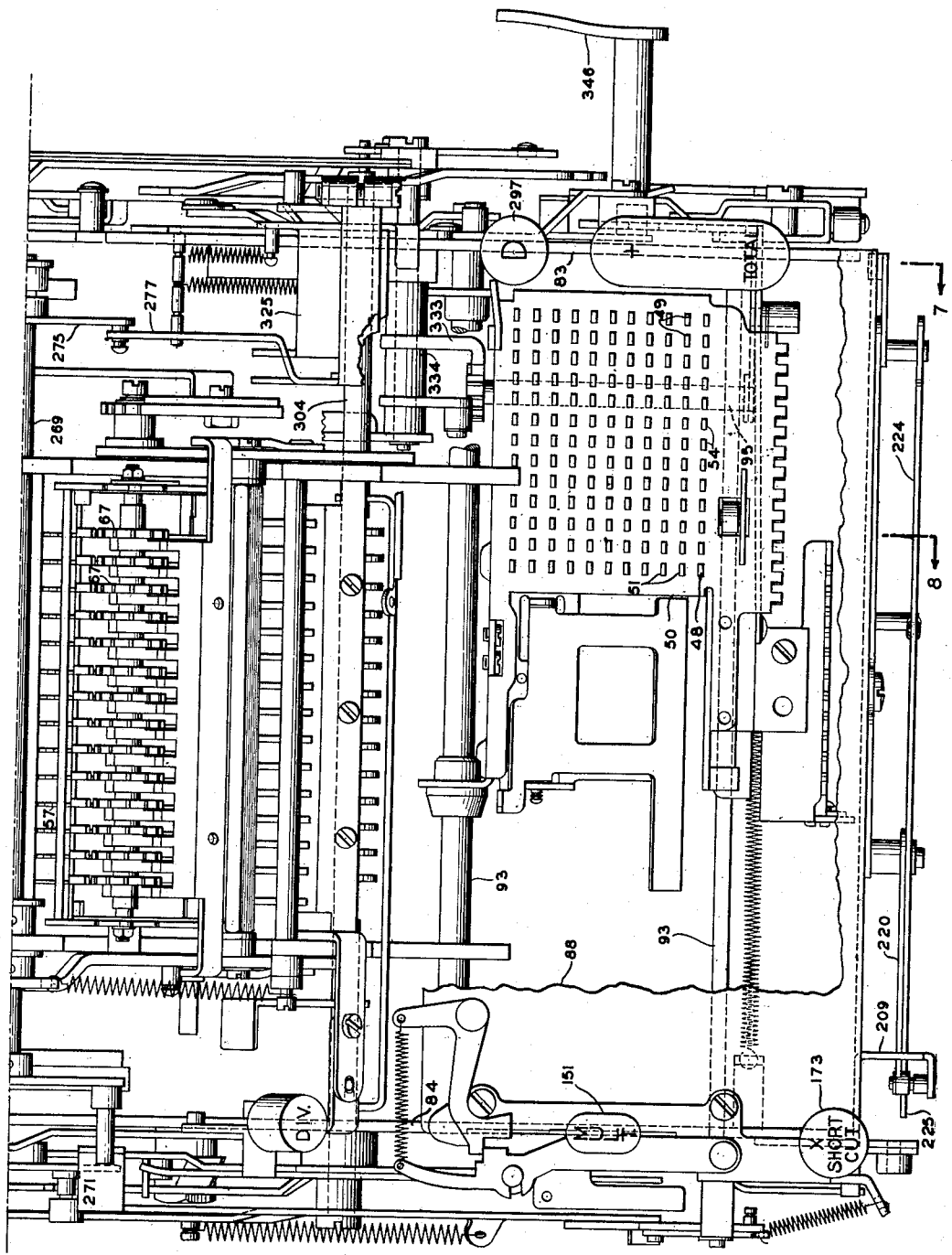
Fig. 4 is a top plan view of the forward portion of the machine with parts cut away so as to show the framing and the relative arrangement of the mechanism of the machine.

To further clarify the understanding of my calculator it is well to here take up the general structure and operation of the machine. Reference is directed especially to Figs. 4, 4a, 5, 6, 8 and 11, wherein is shown a pin carriage 50 in which is contained a group of stop pins 51 which are depressed or "set" by the stems 52 of the digit keys 53, with the space stop pins 54 being set by the stem 55 of the space stop key 56. The carriage 50 in normal inactive position is positioned at the right of the machine so as to place the extreme left hand or highest order column of stop pins beneath the key stems. The carriage is tensioned to the left by a spring 57. Suitable escapement mechanism (Fig. 6) generally designated 58 is provided to permit the carriage to move leftward one step each time a digit key 53 or the space stop key 56 is depressed to place a new column of pins beneath the key stems. Limited in the extent of their movement by the stop pins, which are set up by depression of the digit keys or space key, are adding racks 59 (Figs. 7 and 8) located for longitudinal movement beneath the pin carriage 50. Each of these racks is connected by pin 60 and slot 61 to an associated slide 62 formed with an upturned heel 63. These slides are held in their normal or forward position against the tension of a spring 64 by means of a bail rod 65 which is cam controlled as shown in Figs. 1, 4 and 6 of Patent No. 2,229,980 through arm 334, roller 331 and cam 315 of said patent. Each time the machine is cycled the bail rod 65 moves rearward releasing and permitting the slides 62, with their associated racks 59, to follow under tension of their connected springs 64 until their heels 63 limit against any stops 51 or 54 set up in the path of the heels of the respective slides. These racks on movement project rearwardly of the machine and are formed with a series of notches or rack teeth 66 along their upper edges for engaging the teeth of the rotatable accumulator pinions 67 and also for engaging the teeth of the rotatable type rack raising pinions 68. The type rack raising pinions are normally in a position disengaged from the adding racks 59 and engaged with the type racks 73. On the initial part of the machine cycle a hammer restoring bail rod 70, unless blocked by a blocking toe 71 (Fig. 24), as it is during non-print cycles in multiplication and division operations, moves rearward to cam and shift laterally, through cam 80 (Fig. 18), the pinion shaft 72 and its associated type rack raising pinions 68 to a position permitting engagement of the pinions 68 with the adding racks. The pinions 68, when in engaging position with both the type racks 73 and the adding racks 59 are adapted, upon being rotated by the adding racks to raise the type racks a distance in accordance with the extent of the rearward movement permitted to the adding racks as determined by the stops 51 set in the pin carriage 50. Since the type racks are normally limited in cipher position, the adding rack 59 does not move rearward to actuate the type racks until a stop above a cipher stop is set in the pin carriage. This is brought about by the slot 61 and pin 60 connection of the slide 62 to the rack 59. The slide 62 alone moves rearward under tension of the spring 64 when a space or cipher stop is set in the carriage. The type 74 carried by the type racks 73 are adapted to be struck by hammers 75, which hammers are pivoted upon a tie rod 76 and are urged rearwardly by springs 77 to strike such type. The hammers 75 are prevented from effectively firing on non-print cycles in multiplication and division operations by the blocking of the hammer restoring bail rod 70 by the hammer restoring bail rod blocking toe 71 (Fig. 24). Printing is effected upon a tally sheet on a platen 79 upon striking of the type 74. The type hammers 75 are restored to normal position by the hammer restoring bail rod 70. During the return of such hammer restoring rod to normal position the camming action of the cam 80 against the type rack pinion shaft 72 is released and such shaft with its associated pinions 68 is spring tensioned back to normal position disengaged from the adding racks 59. The accumulator 81 is of the reversible type such as that contained in Patent 2,237,881 having two sets of intermeshing pinions 67 one for addition and the other for subtraction. Suitable mechanism generally designated 262 in Fig. 7 such as is set forth in Patent 2,237,881 and detailed in Patent 2,203,336 is contained in the machine for reversing the accumulator from add to subtract position and back again to add position. Normally the lower or adding accumulator pinions are in mesh with the adding racks. When accumulations are to take place the accumulator pinions in conventional manner as in Patent No. 2,237,881 are raised out of mesh on the initial stroke of the machine cycle and are thrown back into mesh with the adding racks on the return stroke for either addition or subtraction as the case may be.

Totaling is performed on the machine by cycling the machine twice in succession with nothing set up in the carriage. In the performance of division and the various kinds of multiplication, such as regular, short cut and discount multiplication, blank stroking and totaling take place automatically in the same manner and by the same mechanism as in my U. S. Patent No. 2,688,439, at the end of the problem.

Suitable framework (Figs. 1a, 4, 4a, 6 and 7) for supporting the machine consists of a bed plate 82, right outer side plate 83 and left outer side plate 84, inner right side plate 85 and inner left side plate 86, various cross shafts, a front plate 87 and a top plate 88. This top plate serves as the lower keyboard plate.

The motive power for cycling the machine (Figs. 1a and 4a) is derived from a suitable motor 90 and associated clutch mechanism. The clutch mechanism generally indicated by the numeral 91 is of the conventional type such as is disclosed in the U. S. Patent No. 2,688,439 and in Patent 2,237,881. The motor 90 is positioned at the rear of the machine on the bed plate 82. It may be of the conventional single speed type, or as here of the dual speed kind such as is described in my U. S. Patent No. 2,688,439. The motor is operatively connected to the main operating drive shaft 92 (Figs. 1, 1a and 7) through meshing gear segments 92A, and arm 92B operated from the cam 169 by roller 92C.

The pin carriage assembly is of the same general construction and mode of operation as that contained in the U. S. Patent No. 2,688,439 and in Patent No. 2,203,336, but differs in that it has a material addition. Besides the usual digit stops representing the digits from "0" to "9" there is contained in such carriage an additional row of stops herein called space stops.

Referring especially to Figs. 4, 4a, 6, 7 and 8 that we may better go over the general construction of the pin carriage assembly to show the nature of the added pin stops, there is shown a carriage 50 adapted for movement transversely of the machine on rails 93. It is urged leftward by a suitable spring 57 and is controlled in its leftward movement in a step by step manner by suitable escapement mechanism designated as a whole by the numeral 58. Supported in the carriage 50 by springs 94 are a plurality of columns of stop pins generally designated 51 which include the usual rows of pin stops representing the digits from "0" to "9," and positioned forward of the "0" stops 49 is an additional row of stops 54. These added stops are space stops, and while not representing any digit number a space stop is, like the digit stops, considered a value stop, it being used in lieu of added ciphers in the indexing of multiplication and division keyboard entries.

In this machine there are thirteen columns of stops 51. Each column begins with a space stop 54, followed by a "0" stop 49 and the 1 to 9 numeral stops. The first space stop 48 in the extreme left column of stops, is a fixed stop, there being no need of a settable stop at this point.

The pin carriage 50 is normally positioned at the extreme right of the machine with its first row or highest denominational column of pins positioned directly beneath the lower ends of the key stems 52 of the digit keys 53 and the space key 56. There is also shown a universal bail rod 95 (Figs. 4 and 6) which is linked by arm 96 to the escapement mechanism 58 and is longitudinally positioned beneath the conventional shoulders of the digit and space key stems. Upon each depression of any of the digit keys 53 or the space stop key 56 contained in the keyboard 97 the bail rod 95 is rocked clockwise to actuate by its link 96 the conventional escapement mechanism 58. This action permits the pin carriage 50 under tension of its spring 57 to move leftward one step, and in doing so to position a new column of stops 51 beneath the key stems.

The stops 51, when set up by depression of the space or digit keys, serve to arrest the rearward movement of the slides 62 and their associated adding racks 59 as described. The purpose of the space stops is not only to index a space behind a figure entered into the pin carriage, but primarily to prevent the customary printing of meaningless ciphers which would occur were it not for such space stops. Novel mechanism now about to be described, associated with each of the several adding racks, prevents such cipher printing in those columns wherein space stops have been entered.

Figure 12:
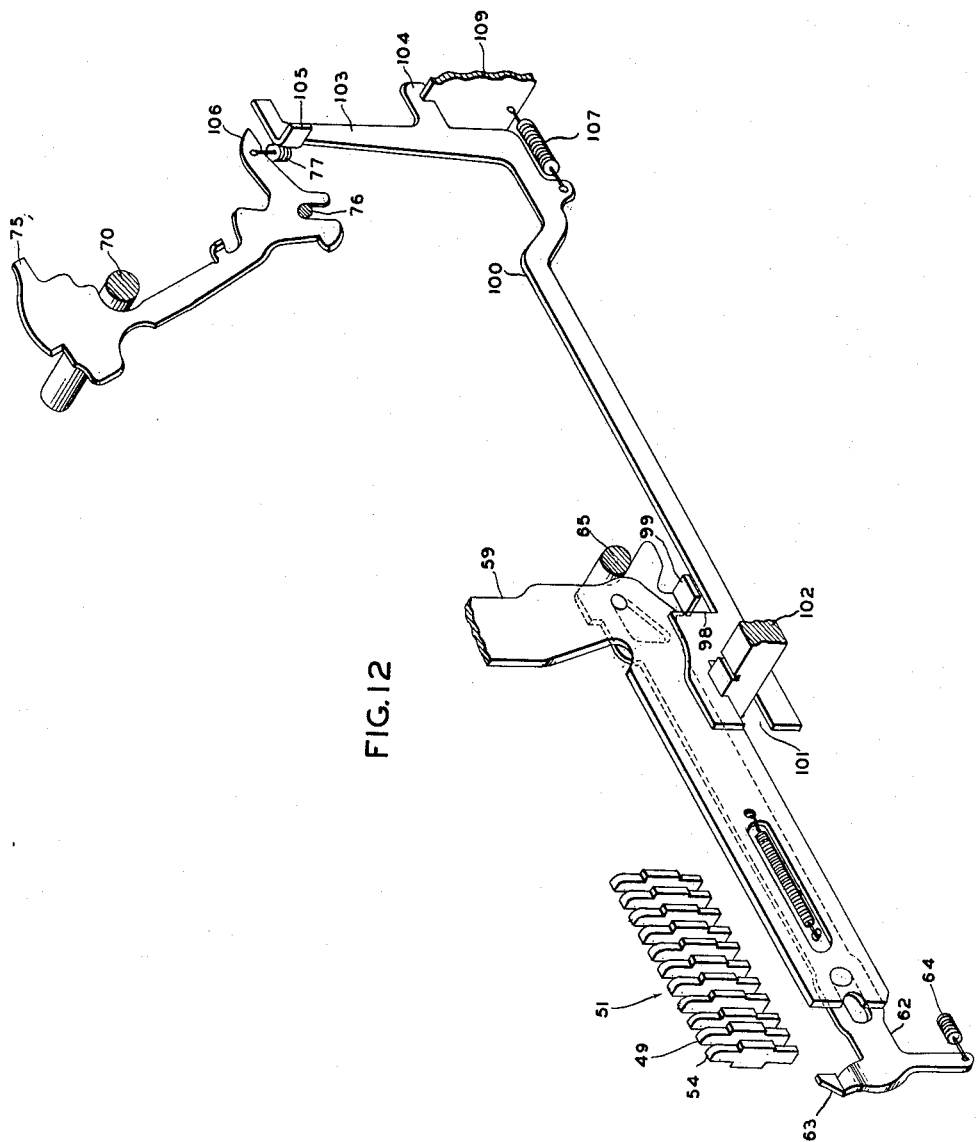
Fig. 12 is a detailed perspective view of the cipher non-print mechanism.
Figure 17:
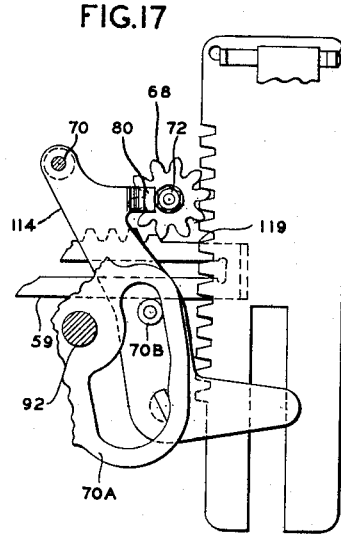
Fig. 17 is a detailed side elevation view of the mechanism shown in Fig. 18.

Referring to Figs. 12 to 16 inclusive and in particular to Fig. 12, there is shown one of the several adding racks 59 with its associated novel cipher non-printing mechanism. Limited by its shoulder 98 against the ear 99 of an adding rack carry slide 62, is a rearwardly extending hammer block slide 100 having a slot 101 for guidance at its forward end on a fixed cross beam 102. Projecting upwards from the rear of the block slide 100 is a type hammer block arm 103. The block slide 100 is guided for longitudinal sliding movement by a tail 104 at its rear, slidable in a suitable slot of a fixed member 109. An ear 105 on the projecting hammer block arm 103, when positioned in the clockwise path of movement of the type hammer toe 106, serves to block effective firing of the type hammer 75 and thereby prevents printing.

It will be seen that on the initial stroke of the machine, after a space stop 54 has been set up in the stop carriage 50, the rack carry slide 62, under tension of its spring 64, moves rearward until stopped by its heel 63 limiting against the set up space stop. The rack carry slide 62 in sliding rearwards removes its limiting ear 99 from the shoulder 98, whereupon the hammer block slide 100, tensioned by its spring 107, is drawn rearward to a position wherein the block arm ear 105 remains under the print hammer toe 106 to prevent effective firing of the hammer. Upon the setting of any stop 51 rearwardly of a space stop, the hammer block slide 100 will be permitted to move rearwardly sufficiently to carry the hammer block arm ear 105 out of the path of the print hammer toe 106 and thereby permit effective hammer firing.

Figures 13, 14, 15, 16:
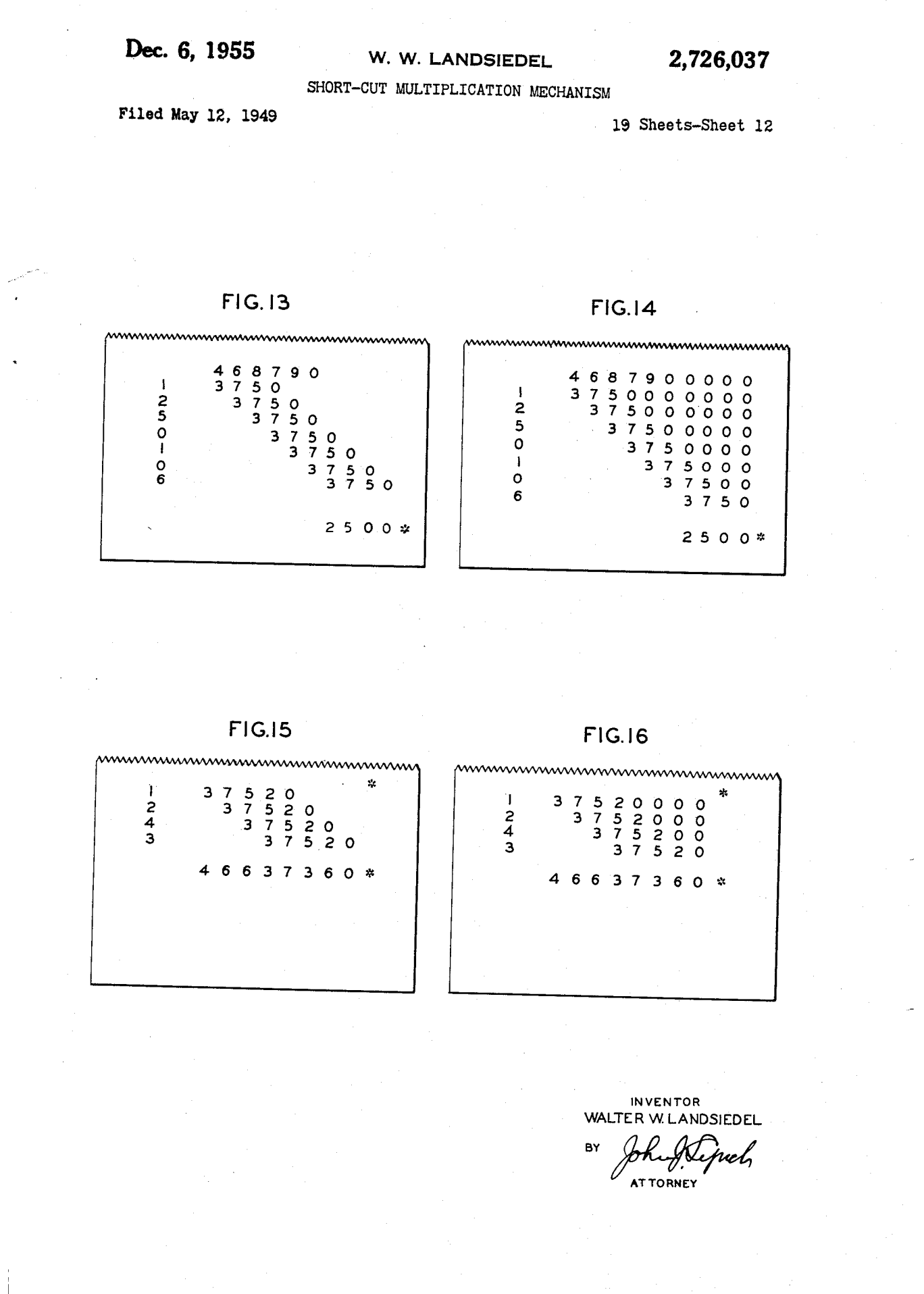

Now, to illustrate what occurs on a tally sheet where printing is effected, after space stops instead of cipher stops have been indexed behind a figure entered into the pin carriage, reference is directed to Figs. 13 and 15 showing respectively printed examples of a division and a multiplication problem performed on a machine where space stops and cipher non-print mechanism is incorporated, and to Figs. 14 and 16 showing respectively printed examples of the same problems performed on a machine not having such improved mechanism.

The division problem (Fig. 13) is set up as follows: In the machine having the cipher non-print assembly the dividend 468790 is first entered into the pin stop carriage, the space key is then depressed 4 times setting up 4 space stops, and the dividend so indexed is entered into the accumulator. Next, the divisor 3750 is set up and the space key is depressed 6 times setting up 6 space stops to locate the divisor 3750 directly under 4687 of the dividend. In a machine not having the space stop and associated cipher non-print assembly, cipher stops are indexed in lieu of space stops in setting up the dividend and divisor.

The multiplication problem (Fig. 15) is set up as follows: In the machine with the cipher non-print assembly the multiplicand 37520 is first entered into the pin stop carriage, then the space key is depressed 3 times setting up 3 space stops which is one less than the number of digits in the multiplier "1243" and then the multiply key 151 is operated and multiplication proceeds in the regular manner. In a machine not having the space stop and associated cipher non-print assembly, cipher stops are indexed in lieu of space stops in setting up the problem.

It will be noted from Figs. 14 and 16, in the cases where the cipher stops have been indexed, that such meaningless ciphers have been printed in the performance of the problem, whereas in the examples in Figs. 13 and 15, where the space stops have been indexed, such meaningless ciphers were not printed.

Another improvement associated with the adding racks on non-print operations and incorporated into this machine concerns the vertical movement of the type racks 73 explanation of which will now follow.

In printing operations on this machine as well as in the earlier machines mentioned above (Fig. 8) the type racks 73 carrying type elements 74 are caused to rise vertically to printing position with the rearward movement of the adding racks 59. The type hammers 75 when unblocked by the rearward movement of the hammer restoring bail rod 70 and when released from the hammer lock bail sear 108 are urged by springs 77 to strike such type elements 74.

In machines as heretofore constructed the type racks 73 are normally in a position engaged with the adding racks 59 which causes such type racks to move up and down with the longitudinal movement of the adding racks. This up and down type rack movement occurs in such machines on all printing operations as well as on those operations where printing does not take place, such as where the print hammers 75 are prevented from effectively firing by the blocking toe arm 71 during multiplication and division problems.

In the machine of the present application the type racks 73 are normally in a position disengaged from the adding racks 59 and move up and down only on printing cycles. This has been accomplished through the novel machanism shown in Figs. 17 to 20 and now to be described.

Figure 18:
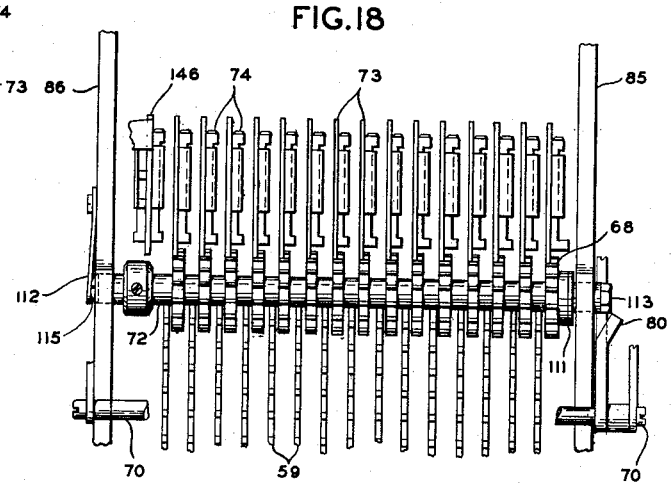
Fig. 18 is a detailed plan view of the lateral type rack raising pinion shift assembly in normal position showing principally the type racks in normal position and their operating pinions shifted laterally out of mesh from the adding racks.
Figure 19:
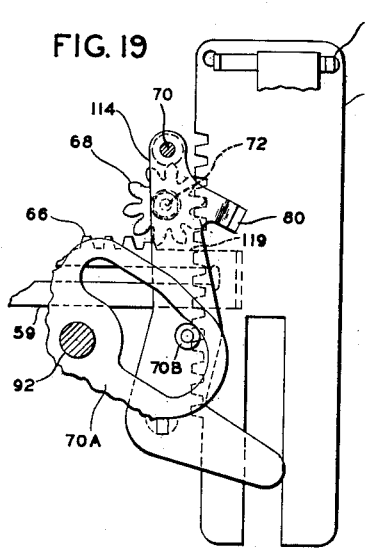
Fig. 19 is a detailed right side elevation view of the mechanism in Fig. 20.
Figure 20:
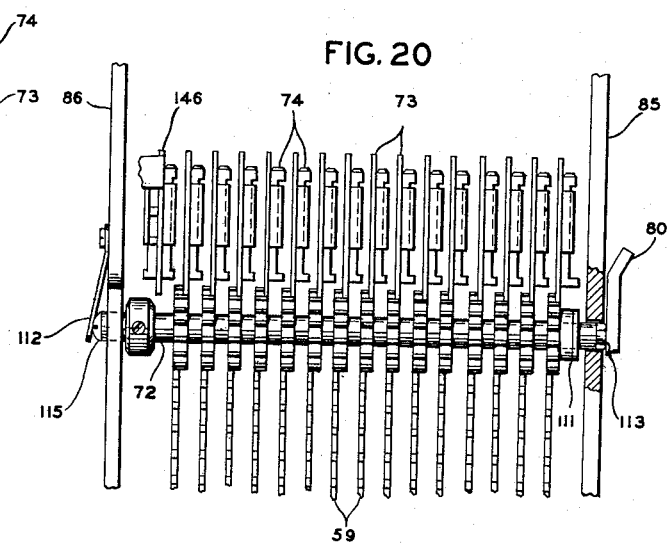
Fig. 20 is a detailed plan view similar to that shown in Fig. 18, but showing the type racks with their operating pinions shifted laterally to operative position in mesh with the adding racks.

Referring to Fig. 18 the type rack raising pinions 68 are shown in normal position engaged with the type racks 73 and disengaged from the adding racks 59. The pinions 68 are rotatably mounted in proper spaced relation on the pinion shaft 72 which is carried for lateral slidable movement in the inner side frames 85 and 86. The pinion shaft 72 is limited in the extent of its movement to the right by the space washer 111. A flat spring 112 on the left inner side frame 86 constantly tensions the shaft 72 and its associated pinions 68 toward the right to a position where the pinions 68 are disengaged from the adding racks 59. While so tensioned by the flat spring 112 the shaft end 113 extends through the right inner side frame 85. Positioned on the right arm 114 of the hammer restoring bail rod 70 is a cam 80.

Responsive to the cycling of the machine the hammer restoring bail rod 70 moves rearward to unblock the type hammers 75 for printing (Fig. 8). The bail rod 70 is carried by arm 114 operated by cam 70A and roller 70B from the drive shaft 92, which structure finds its counterpart in bail bar 323, arm 324, cam 203 and shaft 52 of Patent No. 2,203,336. The cam 80 moves as in Figs. 19 and 20 along with the bail rod 70 to cam the projecting shaft end 113 and shift the pinion shaft 72 with its associated pinions 68 leftward to place such pinions in engageable position with the adding racks 59. A space 119 at the end of the adding racks, formerly occupied by three teeth, facilitates lateral shifting of the pinions 68 for alignment with racks 59. Upon the pinion shaft 72 being moved laterally the left shaft end 115 is projected through the left inner side frame 86 against the tension of the flat spring 112. As the adding racks 59 progress rearwardly the type rack pinions 68 are engaged and actuated to raise the type racks 73 to printing position. The hammer latch bail 116 (Fig. 8), also responsive to the cycling of the machine, is rocked through its shaft counterclockwise to lift its sear 108 from the hammer heels 117 and thus allow the hammers 75, which are under constant clockwise tension of springs 77, to strike the type 74 and effect printing. Printing is effected at about the start of the return stroke of the machine cycle. After the hammers 75 have fired, the hammer restoring bail rod 70, on the return stroke of the machine cycle, is drawn forward to restore the type hammers to normal position. On this return movement of the hammer restoring bail rod the cam 80 is retracted, toward the end of the cycle, from the right shaft end 113. With this retraction of the cam 80 the pinion shaft 72, under tension of the flat spring 112, shifts laterally to the right carrying with it the type rack raising pinions 68 to normal position out of engagement with the adding racks 59.

In multiplication and division problems performed on the old machines as well as on the present machine the type hammers 75 are prevented from firing on non-print cycles by the toe arm 71 which blocks the rearward movement of the hammer restoring bail rod 70 (Fig. 24). In the old machines the type racks moved up and down even on such non-print operations. It is apparent, however on such non-print operations in the present machine, due to the blocking effect of the toe arm 71 preventing the bail rod 70 from moving rearwards, that the type rack raising pinions 68 will not be cammed leftward to engaging position with the adding racks 59 and the normally disengaged type racks 73 will therefore not go through any such unnecessary up and down movements.

It can thus be readily seen that by disengaging the type racks from the adding racks the machine will, on multiplication and division problems, operate faster, quieter and with less parts moving.

Figure 21:
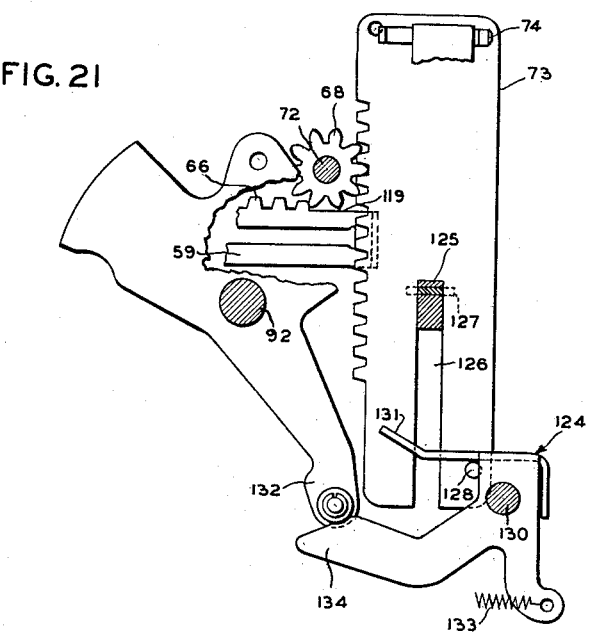
Fig. 21 is a detailed right side elevation view of a type rack in cipher position disengaged from the adding rack and showing the end portion of the adding racks without teeth and the locking mechanism for preventing the type racks from rebounding on carry operations.
Figure 22:
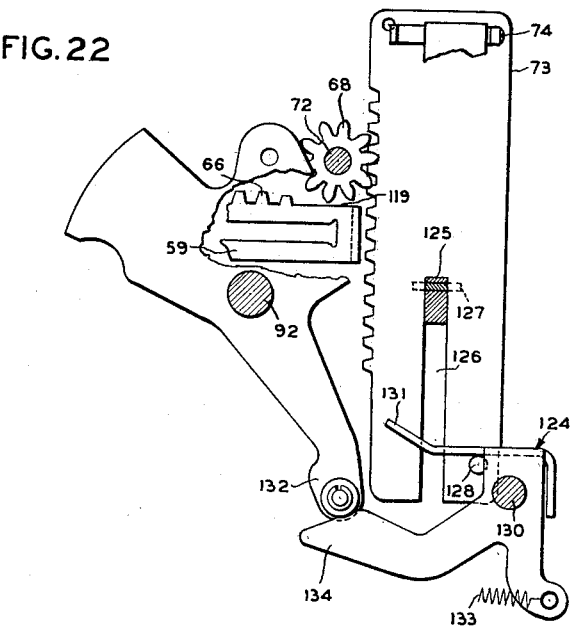
Fig. 22 is a view similar to that shown in Fig. 21 but disclosing an adding rack in carry position.
Figure 25:
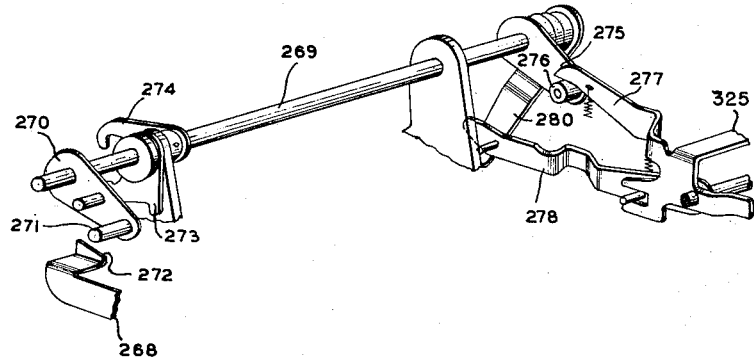
Fig. 25 is a perspective view of the hammer catch shaft and its related parts in detail at the top of the machine.

Because of the large capacity and generally increased speed of the machine a faster carry or transfer operation is required. It will be noted from Figs. 21 and 22 that three rack teeth normally occupying the rear space 119 on the adding racks 59 have been removed. This space permits the adding racks 59, when the type racks 78 have limited in cipher position, to be disconnected from the type rack raising pinions 68 and thereby operatively disconnected from the type racks. Carrying takes place in conventional manner toward the end of a machine cycle. On printing cycles carrying occurs after the type racks have limited in cipher position and at a time when the type rack raising pinions 68 have not as yet been shifted laterally back to normal position out of line with the adding racks. Fig. 21 shows a type rack limited in cipher position before carrying takes place. Fig. 22 shows the relative position of the adding rack after carrying has taken place. This innovation of removing the last three teeth from the adding racks allows a faster carry operation as it eliminates the customary dragging of the type racks on carry operations as will now be described.

The conventional carry or transfer mechanism is used in this machine (Fig. 8). As we know from the earlier mentioned patents, when the accumulator wheels 67 pass from a "9"–"0" or from a "0"–"9," carrying takes place when a lug 120 carried by each accumulator wheel 67 on its left side presses down a carry pawl 121, so that a flange 122 on the adjacent adding rack 59 is free upon forward movement of such adding rack to enter a pawl notch 123. The adding rack 59 on such operation is caused to carry or move an extra unit distance forward of its normal position.

In the conventional machine where the adding racks by means of the type rack pinions are in engagement with the type racks such type racks are drawn or dragged an extra unit distance downward on such carry operations. It is apparent that by removing the last three teeth from the adding racks a space 119 will be created by means of which the type rack raising pinions 68 and thereby the type racks 73 will be free of the adding racks 59 on carry operations and as a result this dragging of the type racks cannot occur in the present machine. Elimination of such dragging effect permits a faster carry operation.

In such carry operations there is a tendency of the type racks 73 when disconnected from the adding racks, to rebound and have excessive play. This rebound if permitted to exist in this machine would cause the type rack pinions 68, which are always in engagement with the type racks, to be at times out of position and thereby create difficulty when the pinions are required to mesh with the adding racks 59. This difficulty is eliminated by a comb like bail 124 which serves to hold the type racks 73 down, when they have limited in cipher position, upon the type rack guide shim 125 and thereby prevent any excessive up and down play of the type racks.

Now referring especially to Figs. 21 and 22 there is shown one of the type racks 73. These type racks are slotted at 126 and guided for vertical movement by the type rack guide plate 127. When lowered to their normal or cipher positions the type racks limit against the type rack guide shim 125. Carried at the lower ends of the type racks are the studs 128. Pivoted on a fixed cross shaft 130 is a comb bail 124 the teeth 131 of which extend in between the type racks and over the studs 128. When the type racks are limited in normal position, a roller bearing arm 132, fast to the main operating shaft 92, holds this bail 124 in its counterclockwise position against the tension of the bail spring 133 with the bail teeth 131 over the type rack studs 128.

It can be seen that upon the forward stroke of the machine the arm 132 is raised counterclockwise with the movement of the main shaft 92 to free lock arm 134 of bail 124. The type rack bail 124 with its teeth 131 is then drawn by the spring 133 clockwise to free the type racks for vertical movement. Upon the return stroke of the machine, bail 124 is pressed counterclockwise by the main shaft arm 132 acting upon the bail arm 134 to reposition the bail teeth 131 over the rack studs 128.

In totaling operations the machine first goes through the conventional blank stroke to condition the machine for a total operation. After this blank stroke the machine is cycled again for the customary total operation. On the initial stroke of the machine cycle the accumulator wheels 67, as we know from previous disclosures, remain in mesh with the adding racks 59. The adding racks then move rearward to unroll the accumulator wheels 67 to zero position, and with such rearward movement raise the type racks 73 to printing position. The hammer latch bail 116 fixed to shaft 116A is then rocked counterclockwise through linkage 116B from shaft 130 which is in turn oscillated through arm 135 which is actuated clockwise upon rotation of the motor cam plate 169 (Figs. 1 and 1a) against the tension of a spring 130A by pins 135A on cam plate 169. Upon rocking of the hammer latch bail 116 the print hammers 75 are released to effect printing at about the start of the return stroke. With printing effected the accumulator wheels 67 in conventional manner are then raised out of mesh from the adding racks 59. It is after this unmeshing on the return total stroke that such adding racks have a tendency to jump and slam rearwards.

This difficulty is eliminated in the present machine by the innovation of means to restrain the adding racks 59 against such rearward movement. To accomplish this rack teeth 136 (Figs. 9 and 10) have been added to the lower edges of the adding racks 59 to be engaged by restraining pawls 137 pivoted on the hammer latch shaft 138. These pawls are normally held disabled in counterclockwise position by the hammer bail latch 116 against the tension of springs 139. It is plain that with the counterclockwise movement of the bail latch 116 the pawls 137 will be released and spring drawn clockwise to engage the notches 136 of the adding racks.

Figure 9:
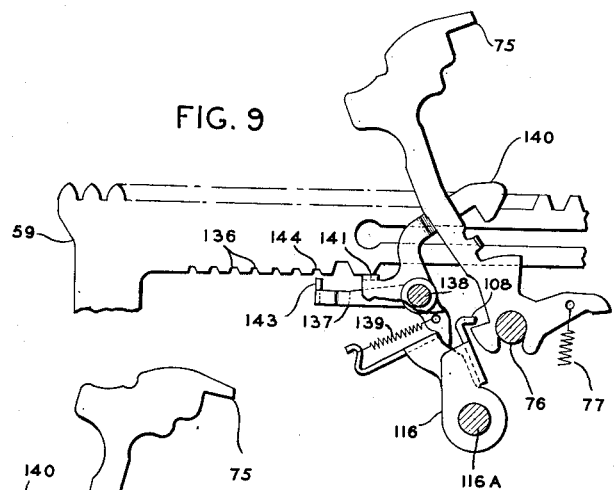
Fig. 9 is a detailed view in right side elevation showing principally the adding rack retaining pawl mechanism in normal position before the print hammer has fired.

In Fig. 9 there is shown one of the adding racks which has moved rearward and is ready to total in "ones" position. The restraining pawl 137 is shown still held disabled by the bail 116, which bail is normally released about the middle of the machine cycle.

Figure 10:
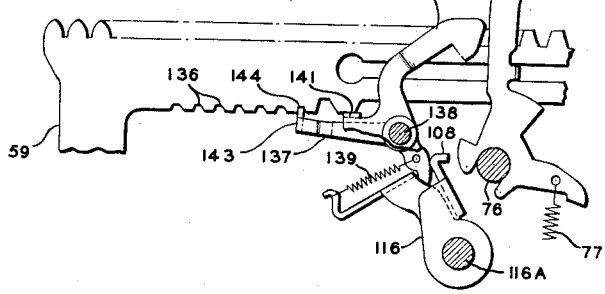
Fig. 10 is a view similar to that shown in Fig. 9 but showing the print hammer to have fired and the adding rack latched by a retaining pawl.
Figure 11:
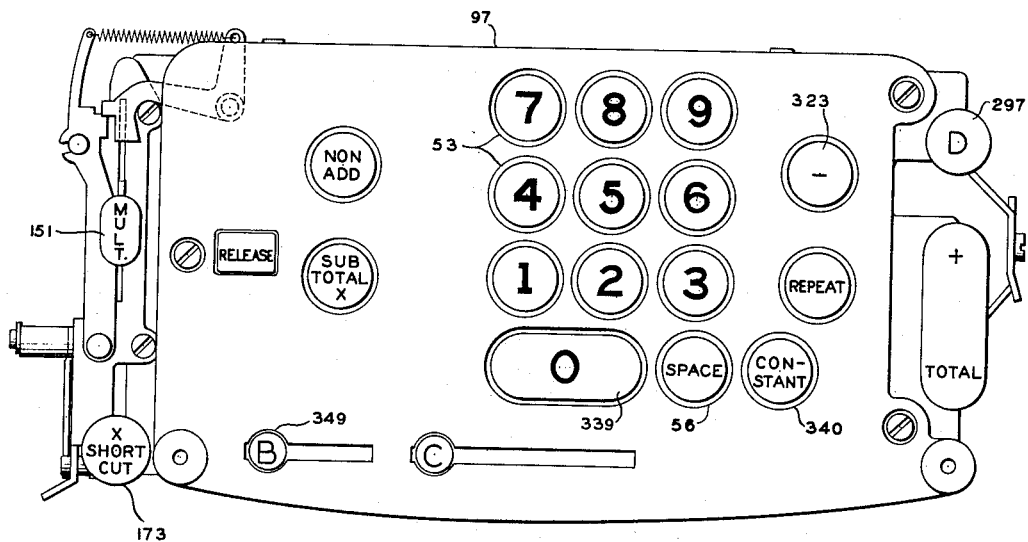
Fig. 11 is a plan view of the keyboard of the machine.

In Fig. 10 the same view is shown after the print hammer 75, has fired, the hammer being shown released in the usual manner by the sear 108 and uncaught by the hooked hammer latch 140 which has limited in its clockwise movement by contact of its ear 141 against the bottom edge of the adding rack. The pawl 137, released by the bail latch 116, has been spring tensioned clockwise to engage, by its ear 143, the "one's" tooth space 144 of the adding rack 59.

When an adding rack is latched by its associated restraining pawl it is locked against further rearward movement, but, however, it is able to move forward to return to its normal position. As the rack 59 moves forward to normal position the pawl ear 143 escapes counterclockwise under pressure of the forwardly moving rack and springs again clockwise to catch the succeeding notch of the rack, continuing in this manner until the rack 59 has finally restored at the end of the return cycle stroke, at which time the hammer bail latch 116 moves clockwise to restore the restraining pawl 137 to disabled position.

In regular, short cut and discount multiplication hereinafter described, as well as in division operations, a function of the machine is to count the machine cycles and to print the number of cycles as indicated on a dial counter (Fig. 2). The conventional mechanism for such dial counter as contained in the machine of U. S. Patent No. 2,688,439 above mentioned and as disclosed in Patent No. 2,237,881 is also contained in this machine. However, due to the innovation of the short cut mechanism in the present machine the conventional dial type rack 146 associated with the dial counter is materially changed so as to contain two columns of type, positive column 147 or the conventional set of type and a negative column 148. The positive or conventional dial type is positioned on the right side of the rack and the negative column of type is on the left side. The type on the negative side starts with the numeral "9" at the top of the column and goes down to "1" at the bottom of the column. The negative type 148 is adapted to be struck by the negative hammer 150. In short cut multiplication this occurs to print the "tens" complement of the number indicated on the dial. For example, in a short cut multiplication problem where the multiplier is "7" the machine will be cycled until the dial 145 registers "3" cycles at which time a multiply lever will be released and printing on the subsequent cycle takes place. The negative hammer will strike the "7" type of the negative column which is the 10's complement of "3." Apart from this improvement in the dial counter type rack 146 the dial counting mechanism is the same as in the U. S. Patent No. 2,688,439 and the patents mentioned above.

Figure 3:
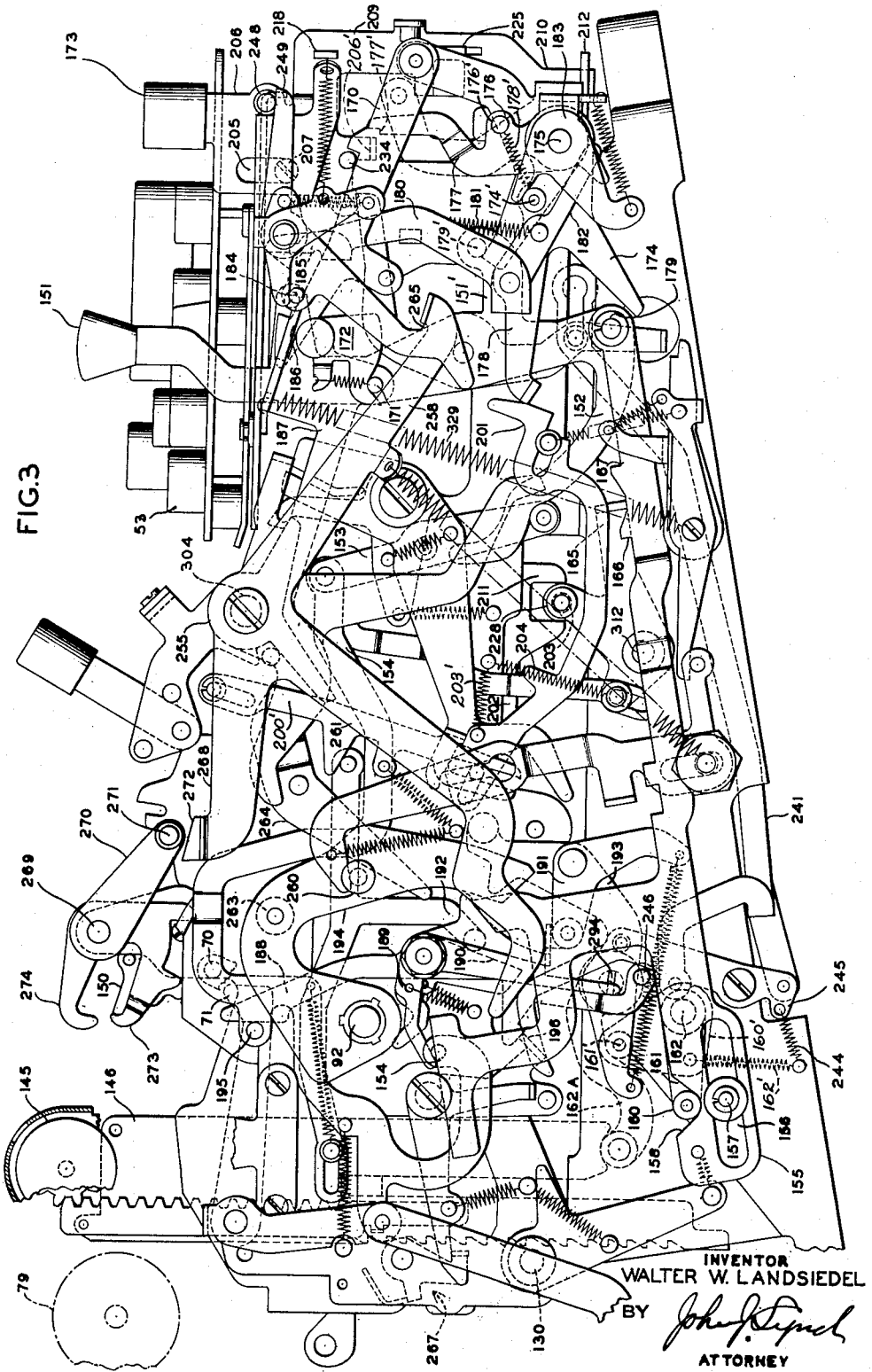
Fig. 3 is a left hand side elevation view of the machine in normal position disclosing its general structural make up.

Except for the improvements described previously herein, whereby the meaningless ciphers are not printed and the type racks do not rise on non-print operations, the mechanism and method of performing regular multiplication on this machine is identical to that of the U. S. Patent No. 2,688,439. However, such mechanism is described herein because it is used in combination with the short cut mechanism, hereinafter described, to perform short cut multiplication, and is used in combination with the discount mechanism, also later set forth therein, to perform discount multiplication. Referring to Figs. 3 and 24, pivoted on the left side frame is a multiply lever 151 adapted for either rearward or forward movement. This lever has at its lower end a curved rearwardly extending arm 152 cooperating with a pivoted rocker arm 153, which rocker arm is linked to the long rearwardly extending curved link 154. Pushing the multiply lever 151 rearward causes, through such link 154, the blocking toe 71 to prevent effective firing of the print hammers 75 by blocking the rearward movement of the print hammer bail rod 70. Blocking of this bail rod also prevents raising of the type racks 73 as it prevents rearward movement of the cam 80 that is fast to the right side of the bail rod 70. Rearward movement of the cam 80 serves to shift the type rack gears 68 laterally to permit engagement of the type racks 73 with the adding racks 59 as explained earlier in this specification.

Further, there is shown pivoted to the lower end of the multiply lever 151 a rearwardly extending slide 155 guided for longitudinal movement by appropriate means such as the slot 156 on the headed stud 157. Carried in a notch 158 of this dial raising slide 155 is a roller 160 on one end of an arm 161 which arm is fast to a transverse shaft 162. As shown in detail in Fig. 30, pinned to shaft 162 is a plate 160' which is turned clockwise as the arm 161 is turned by the raising of the roller 160 out of the notch 158. The plate 160' has a roller 161' thereon which lies beneath the curved surface of an arm 162A which is loosely pivoted on the shaft 294. A spring 162' connected to plate 160' resists its turning movement. A roller 162B on the outer end of arm 162A lies beneath the rack 146 and raises it and turns the dial 145 to zero position. This arm 164 normally serves to restore the pin carriage 50 to its normal position at the right of the machine in the course of a cycle. This mechanism is disclosed in Fig. 11 of U. S. Patent No. 2,688,439. Responsive to either a forward or rearward movement of the multiply lever 151 the roller 160 is raised and cammed out of its notch 158 on movement of the slide 155 which action, besides causing the dial 145 and dial type rack 146 to move to the zero position, causes the disabling pin 163 to raise and disable the pin carriage restoring arm 164. This disabling pin is also raised through suitable linkage to disable the carriage restoring arm 164 with each backspace operation of the back space cross shaft lever 193 later described. Either rearward or forward movement of the slide 155 (Fig. 24) also causes the multiply latch 165 to latch either shoulder 166 or 167 on the long slide 155. This multiply latch serves to keep the multiply lever 151 rearward for a complete cycle, and (Figs. 1, 1a) such latch is released at the end of the machine cycle through actuation of a multiplier lever shaft 312 which has fixed thereon an arm 312' (Fig. 31). Loose on the shaft 312 is a lever 317' having at the top an ear 318' and at an intermediate point a stud 320 which rides in a slot 321 in a link 168 which is pulled rearwardly once each cycle by the rotation of the motor cam plate 169 as more detailed in Patent 2,237,881. As the lever 317' is moved clockwise its rear edge abuts a stud 320' on the upper end of fixed arm 312' thus turning this arm and rotating shaft 312 which will cause the latch 165 to be raised counterclockwise (as in Fig. 3) and release the multiply link 155.

In Fig. 3 on the left side of the machine there is shown a non-add pawl 170. This pawl when drawn rearward serves to set conventional non-add mechanism disclosed in Patent No. 2,237,881. In regular multiplication it is required that the first machine cycle be a non-add cycle. Hence, when the multiply lever 151 is moved rearward the non-add pawl is also drawn rearward with it to prevent adding on the first cycle. This non-add pawl is disabled in a manner related in my U. S. Patent No. 2,688,439 near the end of the first cycle by action of a pin 171 on the division shaft lever 187 in conjunction with suitable disabling means generally designated by the numeral 172. In short cut multiplication, later described, it is desired that the first machine cycle be an add operation, and upon depression of the short cut key 173 (Fig. 24) this non-add pawl 170 is pushed down to ineffective position out of the rearward path of the multiply lever 151.

The motor bail crank has two arms 174 and 178 and is fixed to cross shaft 175 (see Fig. 32). Arm 174 is engaged by roller 179 when the lever 151 is moved rearwardly and the other arm 178 is engaged by stud or roller 179' when the lever 151 is moved forwardly. The stud 179' is mounted on a lateral extension 151' of the lever 151, as shown in Figs. 3 and 24. When the shaft 175 is thus turned the motor is started in the general manner indicated in Patent 2,237,881 above mentioned or the U. S. Patent No. 2,688,439. Pivoted, also on such cross shaft is a bail 176 on which is an upright arm 177 the upper end of which is notched as at 177' (see Fig. 32). On the side of this bail is a stud 176' to which is connected a spring 178' the other end of which is connected to a stud 174' on the arm 174 of the motor bail crank. As this crank is moved counter-clockwise by either the forward or rearward movement of the lever 151, the spring 178' is stretched and moves the arm 177 to a position below a dependent portion 206' of the stem of the short cut key so that this key can not be operated if the lever 151 has first been moved. Pivoted on an arm 178 of the motor crank lever 174 is a tailed extra cycle arm 180 tensioned counterclockwise by its spring 181 and limited in such direction by its tail 182 against the stud 183. Responsive to a forward movement of the multiply lever, as occurs where a digit of the multiplier is a cipher, the motor crank lever 174 is rocked to start the motor 90. On this forward movement, an extra cycle not being desired, the extra cycle arm 180 is blocked by a pin 184 on the multiply lever from moving counterclockwise to its extra cycle position. On the rearward movement of the multiply lever the motor crank lever 174 is rocked counterclockwise to start the motor and, as such motor crank lever is rocked, the extra cycle upright arm 180 moves with it to limit its nose 185 against the extension 186 of the division shaft lever 187 which is pivoted on the left side of the machine on the shaft 304. Under this extension the extra cycle arm 180 is subsequently caught on the cycling of the machine. In this position the extra cycle arm holds the motor crank lever 174 depressed for an extra cycle of the machine after the multiply lever 151 is released, as will be related later.

Either forward or rearward movement of the multiply lever conditions the backspace latches for backspacing operations. Referring to Figs. 3 and 33 there is shown the conventional long backspace latch 188 and the auxiliary backspace latch 189. There is also a third latch, an inner latch 190, which is blocked in disabled position. In normal position, the long latch holds the backspace lever 191 in disabled position, the auxiliary latch is held disabled by the tail end of the long link 154, and the inner latch is held disabled by the curved arm 192. When the multiply lever is moved rearward the positions of the long and auxiliary latches are reversed as a result of the forward movement of the long curved link 154, and the backspace lever 191, with such action, springs clockwise to back space position against the backspace shaft arm 193. With the cycling of the machine the backspace lever 191 is cammed down by the cam finger 194 which is fast to the main operating shaft 92 and is caught by the auxiliary latch 189 where it is held disabled preventing backspacing until after its release, which release occurs with the release of the multiply lever 151 to normal position. When the multiply lever is restored to normal, the auxiliary latch 189 is disabled by the rearward movement of the long curved link 154. Disabling of this latch 189 permits the backspace lever 191 to spring clockwise as said before to backspace position. With the rearward movement of the long link on release of the multiply lever the long latch 188 is unblocked by a stud 195 on the long link 154, but is caught and held disabled by a catch 196. The long backspace latch 188 is released from this catch by the cam finger 194 on the subsequent cycling of the machine. On this subsequent cycle the cam finger 194 presses the backspace lever 191 counterclockwise and passes over it to release the long backspace latch 188 from the catch 196. This long latch is not released soon enough, however, to catch the backspace lever 191 which springs back again to backspace position. On the return portion of the cycle the cam finger 194 rocks the backspace lever 191 clockwise to effect backspacing. Rocking of the backspace lever turns the backspace shaft arm 193 clockwise (Figs. 5 and 8) which movement is communicated through the backspace cross shaft 294 and suitable gearing 294A to rock through shaft 294B the backspace pawl at the front of the machine to backspace the pin carriage 50 one step.

The multiply lever 151 is manually released when the visible dial counter 145 indicates the numeral represented by the first digit of the multiplier. This dial counter mechanism is, as stated earlier, conventional mechanism identical to that of my U. S. Patent No. 2,688,439 above mentioned and that of Patent 2,237,881. Manually releasing the multiply lever 151 permits such lever to be restored to normal position at the end of the cycle. The machine does not thereupon stop, but continues to operate for an additional cycle due to the action of the extra cycle arm 180 which is locked under the division shaft lever extension 186 and thereby holds the motor crank lever 174 depressed in operative position. This extra cycle is a print, add and back space cycle. With the release of the multiply lever the long link 154 is moved rearward to remove the toe block 71 from the print hammer restoring bail rod 70. This action permits the bail rod 70 to move rearward on the cycling of the machine. Rearward movement of the bail rod permits the adding racks 59 to engage with and raise the type racks 73 to print position and allows the print hammers 75 to effectively fire. Release of the multiply lever 151 to normal, as previously explained, conditions the backspace latches to permit backspacing which occurs on this extra cycle after printing is effected. The machine adds once more on this extra cycle and toward the end of the cycle the division shaft lever extension 186 rises and the extra cycle arm 180 is automatically released, permitting motor crank lever 174 to restore and stop the motor. The multiply lever 151 is then pushed rearward again for the next multiplier and so on.

*Automatic blank stroke and totaling*

When the machine has printed for the last digit of the multiplier the machine does not stop but automatically continues to blank stroke, a total and clear the accumulator for the next problem.

This automatic blank stroke and totaling occurs through mechanism associated with the units rack 198 (Fig. 8) as detailed in the U. S. Patent No. 2,688,439 (see Fig. 31 thereof for operation of this structure) and therefore described only briefly here. With the last digit of the multiplier the multiplicand contained in the pin carriage will have reached the units position. With the rearward movement of the units rack 198 on this last multiply operation an upright arm 199 of the units slide 62 rocks a bail 200, a portion of which is shown. Rocking of this bail causes the inner backspace latch 190 (Fig. 3) to be unblocked by the curved arm 192. In this unblocked position this inner latch is enabled to catch and disable the backspace lever 191 on the cycling of the machine thereby preventing backspacing and allowing restoration of the pin carriage 50. In the U. S. Patent No. 2,688,439, the description with respect to Fig. 11 clearly shows how the operation of the multiplier lever 164 therein causes the disabling of the carriage return mechanism. In the present application Fig. 7 shows similar mechanism in which the shaft 162 corresponds to the shaft 186 of the mentioned patent. An arm 162' on shaft 162 is adapted to depress bail member 163' by means of a stud thereon to lift the rod 163 and disable the restoring link 164. Related to this mechanism is an arm 294' on the back space shaft 294 which is also adapted, by a stud thereon to operate the bail member 163' and lift rod 164 and also disable the restoring rod 164. It is clear that when back spacing takes place the carriage should not be restored to normal and similarly should not be restored while multiplying or division operations are taking place. However, when the multiplier lever is restored, the arm 162' is lifted from the bail member 163' and when back spacing is not taking place the arm 162' is not depressing the bail member 163' and the carriage may then be restored. In each cycle if backspacing is to take place this occurs before the link 164 is moved forward so as to disable it before it becomes effective. Rocking of the bail 200 also causes, through suitable linkage, the long curved lever 201 to latch the motor crank lever arm 178 and thereby hold down, in operative position, the motor crank lever 174 whereby the motor 90 is kept running. This operation is shown in Figs. 2 and 12 of the U. S. Patent No. 2,688,439, and described from column 20, line 37, et seq. is also shown perhaps more clearly in Fig. 32 herein in which the long link 201 is shown latching the arm 178 of the motor bail crank 174. This arm is released, as described in the mentioned application, by the lifting of link 200' which causes an ear 201' on its lower end to be released from engagement with a shoulder on the rear end of link 201 to allow spring 203' to pull the link 201 forward into latching engagement with the motor bail arm. As described in the mentioned patent with respect to Fig. 31, thereof, this link 200' is lifted when the arm 199, Fig. 8 herein, is moved away from the lower end of arm 200 when the units rack is moved rearward and has a significant digit therein, as clearly set forth therein. The motor continues to cycle the machine to blank stroke and then to total. On the total stroke the motor crank lever 174 is restored to inoperative position and the motor stops. On the total stroke the total slide 202 moves rearward as is understood. On its rearward movement it acts upon a pin 203 of the multiply latch lever 165 projecting between the ears of a notch 211 on the total slide 202. The multiply lever latch is thereby rocked counterclockwise causing a roller 228 thereon to butt against a shoulder 204 of the curved lever 201 and unlatch it from the motor crank lever arm 178. This action permits the motor crank lever 174 to spring to inoperative or normal position causing the motor to stop at the end of the return stroke. On the total stroke the machine prints the product and clears the machine for the next problem in conventional manner.

*Short cut multiplication*

In the earlier described general description on short cut multiplication it is shown that, after the multiplicand is first entered into the pin carriage and properly indexed with space stops, the short cut key is next depressed to condition the machine for first an add operation and then subtract operations subsequent to such add operation. The manner of this conditioning and the mechanism provided therefor will now be described.

In Fig. 3 there is shown a short cut key 173 mounted for vertical slidable movement by a slot 205 in its stem 206 upon a headed pin 207 which pin is fast to the left hand outer frame plate. Spring 208 at the front of the machine (Figs. 5 and 6) constantly tensions this key 173 to its upper or normal position. Latching means shown at the front of the machine is provided to hold the short cut key 173 depressed until released at the proper time. An arm 209 of the short cut key stem 206 extends downward at the front of the machine and is guided for vertical movement by its tail end 210 in the slot of a projecting ear 212 that is fast to the base plate 82. Limiting against an ear 213 on this extended key stem arm 209 is a nose 214 of a bail latch 215 which latch is pivoted on a fixed stud 216. Responsive to depression of the short cut key 173 the nose 214 tensioned by spring 217 towards the left of the machine latches on to the ear 213 and holds the short cut key in depressed position as in Fig. 6.

Also responsive to depression of the short cut key the pin carriage 50 moves leftward one space or step. Referring to Figs. 5, 6 and 23, an upper slot 218 in the arm 209 carries a tail 219 of a right angular crank 220 pivoted at its apex 221 to the front frame plate 87. A depending arm 222 of crank 220 is pivoted at 223 to a horizontal arm 224 extending across the front of the machine, which horizontal arm has its left tail end 225 playing in and extending through a lower slot 226 of the short cut key stem arm 209. The tail end 225 underlies a roller 227 on an ear of the short cut key stem arm. A shoulder 229 at the right end of the horizontal arm 224 limits against a pin 230 on a bail crank 231 which has an arm 232 connected to the space key 56.

It will be seen as in Figs. 6 and 23 that on depression of the short cut key 173 downward pressure of its stem arm 209 rocks the crank 220 counterclockwise to project the horizontal arm 224 to the right to rock bail crank 231 which in turn actuates the space key 56 through the arm 232 to set a space stop 54 and to also operate the escapement mechanism 58 through bail rod 95 to move the pin carriage 50 one space leftward. Space key 56 immediately upon depression of a space stop 54 springs back to normal position through action of its stem spring 233. This momentary action of the space key is brought about by the brief action of the horizontal arm 224. It is to be noted that momentarily after the shoulder 229 strikes the bail crank pin 230, the key stem arm 209 continues downward and pressure of its roller 227 upon the tail end 225 lifts the horizontal arm 224. This lifting of the horizontal arm 224 causes the bail crank 231 to spring back to normal position releasing the space key 56. Upon lifting of the shoulder 229 from the pin 230 the arm 224 falls to rest in inactive position above such pin, and is restored to normal later on with restoration of the short cut key 173.

Besides actuating the pin carriage 50 to move leftward one step upon setting up of a space stop therein, depression of the short cut key conditions the machine for an add cycle and automatic backspacing of the pin carriage attendant upon such cycle. Referring to Fig. 24 a pin 234, on the short cut key stem 206, overlies the non-add pawl 170, and upon depression of the short cut key this pawl is blocked out of the rearward path of movement of the multiply lever pin 184. This action is necessary as the multiply lever 151, also later to be moved rearward would otherwise, by its pin 184 acting on such pawl 170, set the non-add mechanism, whereas in short cut multiplication the first cycle is required to be an add cycle.

Depressing the short cut key 173 also conditions the machine to automatically backspace the pin carriage on such add cycle. In Figs. 23 and 24 a pin 235 on the short cut key stem 206 overlies the tail 236 of a depending lever 237 pivoted to the left side frame. A stud 238 on the depending portion of lever 237 plays in a slot 240 of a rearwardly extending link 241 which is pivoted at its rear end to a curved block arm 242. This block arm is pivoted on a fixed stud 243. A spring 244 on its depending foot 245 serves to move such block arm and the slotted link 241 to normal upon restoration of the short cut key. Responsive to depression of the short cut key as in Fig. 24, the tailed lever 237 is rocked clockwise and pushes the slotted link 241 rearward. This action turns the block arm 242 counterclockwise. The arm 242 thereupon presses against a pin 246 of the long back space latch 188 to move and block such latch in disabled position with which action the backspace lever 191 is released. A pin 247 on the block arm 242 holds the auxiliary latch 189 also in disabled position.

A further function of the short cut key is to condition the machine for subtract operations subsequent to the initial add cycle. Still referring to Fig. 24 this conditioning is initiated with the depression of the short cut key and is continued further with the cycling of the machine on the add cycle. Another pin 248 of the short cut key stem 206 overlies an arm 249 of a tri-armed bail 250 which bail is spring tensioned counterclockwise and pivoted on a fixed stud 251. A nose 252 of this bail limits against a pin 253 on a hooked latch 254 which latch is also pivoted on the stud 251. Latch 254 serves to hold the tri-armed hammer latch crank lever 255 against the clockwise tension of the spring 256. The crank lever 255 is pivoted on the left side of the machine on the cross shaft 304. Depression of the short cut key 173 (Fig. 24) lifts the nose 252 enabling the hooked latch 254 to later turn clockwise and unhook from the lower crank arm 258 by clockwise tension of the spring 259. Such unhooking of latch 254 occurs during the first cycle of the machine when a roller 260 on the outer side of the finger cam 194 presses down upon a middle arm 261 of the tri-armed crank lever 255 as will be later detailed.

In the performance of short cut multiplication the regular multiplication mechanism is used in combination with the mechanism detailed above. This multiplication mechanism has been sufficiently described earlier in this specification and is identical to that of Fig. 21 of U. S. Patent No. 2,688,439.

Now, referring back to the earlier description herein of the general nature of short cut multiplication, it will be noted that, after the multiplicand is first entered into the pin carriage and properly indexed with space stops, the short cut key is next depressed as in Figs. 6 and 24 to condition the machine as detailed above, for the operations to follow. With the multiplicand entered into the pin carriage and the short cut key 173 depressed the multiply lever 151 is next pushed rearward as in regular multiplication. Pushing the multiply lever rearward actuates the motor and the machine starts to cycle for the first short cut multiplier digit. The multiply lever is manually held rearwards as the machine cycles and is released when the dial counter 145 indicates the ten's complement of the short cut multiplier digit. For example, if the short cut multiplier digit is a "7" the multiply lever will be manually released when the number "3" appears on the dial counter.

On the first cycle of the machine in the short cut multiplication operation about to be described, the multiplicand entered into the pin carriage and as increased ten fold by depression of the short cut key 173, is added into the accumulator 81, the pin carriage backspaces, and the accumulator reversing mechanism generally designated 262 (Fig. 7) and described in the earlier Patent No. 2,203,336 is conditioned to revolve the cradle 81 as the accumulator support is often called, to subtract position on the subsequent cycle.

Referring to Figs. 3 and 24, the finger cam 194, which is fast on the main drive shaft 92, carries an inner roller 263 which overlies the rear end 264 of the division shaft lever 187. Another roller 260 is positioned on the outer side of the finger cam 194 for action upon the middle arm 261 of the tri-armed crank lever 255. Responsive to movement of the main drive shaft 92 the cam finger 194 on the first half of the cycle moves clockwise, the roller 263 thereupon bears down on the division shaft lever tail end 264 to lift the extended end 186 of the division shaft lever 187 upward thereby permitting the nose 185 of the extra cycle arm 180 to move counterclockwise through tension of its spring 181 under the hooked extension 186 where further movement of the extra cycle arm is limited by its tail 182 on stud 183.

As the cam finger 194 continues its clockwise movement its outer roller 260 cams down the middle arm 261 of the tri-armed crank 255 causing the lower arm 258 thereof to raise from the shoulder 265 of the hooked latch 254. This latch is thereupon pulled upwards in disabled position by its spring 259.

Continuing clockwise the finger cam 194 butts against the backspace lever 191, which was released earlier upon disabling of the long latch 188 on depression of the short cut key 173, and presses it down and passes over it without effect. The back space lever 191 thereupon springs back again to back space position since both latches 188 and 189 are held disabled by the curved block arm 242.

On this first half of the cycle the accumulator 81 is raised out of mesh from the adding racks in a manner and by mechanism detailed in the patents referred to herein.

The type racks 73 do not rise as would normally occur on the first portion of a cycle in the earlier machines. This is because the type racks in this machine are normally disengaged from the adding racks 59 and they remain in such condition while the toe 71 blocks rearward movement of the print hammer bail 70. Rearward movement of the hammer restoring bail 70 in this machine would, except for the blocking effect of toe 71, ordinarily through the hammer bail rod cam 80 shift the type rack pinions 63 to operatively engage the adding racks 59 with the type racks 73.

The cam finger 194 now, as the movement of the main drive shaft reciprocates at the end of the forward stroke of the machine, starts its return journey counterclockwise to normal position.

Because of the toe block 71 against the print hammer bail rod 70 printing does not take place as it normally would about the start of the return half of the cycle.

The dial counter 145 by suitable detent mechanism, shown in Fig. 3 in dotted lines and generally designated by the numeral 267, and as is detailed in the earlier Patent No. 2,237,881, is turned from 0 to 1 to indicate the first cycle of the machine. The dial counter 145 turns to its next highest number on the return portion of a cycle, shortly after the time at which printing would ordinarily occur.

Now, on the return movement of the finger cam 194 the pressure of its outside roller 260 is released from the middle arm 261 permitting the hammer catch shaft crank lever 255 to turn clockwise under tension of its spring 256 to cause its upper arm 268 to actuate the dial type hammer catch mechanism. This action reverses the position of the positive and negative hammer catches and sets the subtract mechanism as will now be described.

Referring to Figs. 1, 2, 3 and 25 particularly, there is shown a hammer catch shaft 269 which extends from the left side of the machine across the top to the right side. Fast on the left end of this shaft is an arm 270 on which is a pin 271 overlying a projection 272 on the upper crank arm 268. Fast on the hammer catch shaft is a negative hammer catch 273 and adjacent thereto on the right is a positive hammer catch 274. In normal position the negative hammer catch is positioned to catch and prevent effective firing of the negative dial type hammer 150 while the positive hammer catch 274 is disabled in upward position. At the right end of this hammer catch shaft 269 there is fast thereto a subtract setting lever 275 with a roller 276 which underlies the subtract operating bail arm 277. The raising of this bail arm 277 will raise the subtract yield arm 278. Raising of the subtract yield arm sets up the accumulator cradle reversing mechanism 262 detailed in the earlier Patent No. 2,203,336 to cause the accumulator 81 to revolve to subtract position on the next cycle. It can now be seen that, as the hammer catch shaft 269 is rocked counterclockwise by the projecting ear 272 of the short cut crank upper arm 268, such action lowers the negative catch 273 into disabled position, and rotates the positive catch 274 counterclockwise into position to stop effective firing of the dial type positive hammer 279. Also, with such movement of the hammer catch shaft 269 the subtract setting lever 275 is lifted to rock the subtract operating bail arm 277 which action raises the subtract yield arm 278 to condition the machine to subtract on the next cycle as previously stated. Suitable latching means is provided to hold the subtract mechanism in subtract position for the required number of repeated subtract cycles after which such latching means is automatically released. Reference is directed to this latching means shown on the right side of the machine in Fig. 1. There, it will be noted, fast to the right end of the hammer catch shaft 269 is another depending arm 280 with a projecting pin 281. Pivoted on a fixed stud 282 also on the right side of the machine is a subtract latch lever 283 tending to fall in a clockwise direction but limited in such direction by the subtract block pin 284. This latch 283 when normal, is in disabled position with its hooked nose 285 below the pin 281. In Fig. 1 it can be seen that, as the hammer catch shaft 269 is rotated clockwise to raise the subtract operating bail 277, the arm 280 turns with it and as it does the pin 281 wipes down against the nose 285 and passes under it, where it is held latched. The subtract latch 283 is not released until a subsequent backspacing operation, occurring on the extra cycle hereinafter later described, causes such latch 283 to be removed.

Continuing with the operation of the machine on the still uncompleted return portion of this first cycle, backspacing takes place and with such backspacing the short cut key 173 is restored to normal. This backspace action occurs slightly prior to the latching by the subtract latch above described. Now as the finger cam 194 continues on its counterclockwise movement it acts upon the previously released backspace lever 191 causing the latter to rock the backspace shaft arm 193 and the backspace shaft 294 to which arm 193 is fast. Shaft 294, through its gearing, actuates clockwise the pawl arm 286 and the backspace pawl 197 pivoted thereon (Figs. 5 and 6) to back space the pin carriage. Reference is directed to Patents Nos. 2,237,881 and 2,255,622 for a fuller disclosure of such backspacing mechanism.

The short cut key 173 is restored to normal through action of this backspace pawl arm 286. Referring to Figs. 5 and 6 there is shown mounted by a slot 287, on a headed pin on the front frame, a short cut restoration link 289 the other end of which link is pivoted to a short cut key latch 215. When the backspace pawl arm 286 is rocked clockwise a pin 290 fixed thereon pushes against a raised shoulder 291 on the link 289. The consequent movement to the right of link 289 releases the latch 215 from the short cut key stem ear 213. The short cut key thereupon restores to its normal position under tension of its spring 203, which action rocks the crank 220 clockwise and restores arm 224 to normal.

Upon the restoration of the short cut key 173 the curved backspace block arm 242 is drawn away from the backspace latches 188 and 189, but since the multiply lever 151 is still in its rearward position the long backspace latch 188 remains disabled by the stud 195 of link 154. The auxiliary latch 189, however, with the block arm 242 removed is now enabled to catch the backspace lever 191 on the next forward stroke of the machine as occurs in regular multiplication and in doing so prevents backspacing of the machine until the extra cycle which follows the release of the multiply lever.

On this return half of the first cycle the machine adds the multiplicand into the accumulator.

Toward the end of the first cycle as the cam finger 194 moves on to normal position the inner roller 263 is raised from the rear end 264 of the division arm 187 causing the extension 186 thereof to drop under tension of its spring 329 to hold locked under such extension the extra cycle arm 180 which had previously moved under said extension. The purpose of locking the extra cycle arm is to enable an extra cycle of the machine after the release of the multiply lever. This extra cycle is described later when it occurs after the release of the multiply lever.

On the cycle immediately following the add cycle, since the mechanism for reversing the accumulator 81 to subtract position had been set on the previous cycle, the accumulator reverses to subtract position and subtraction takes place. The means for reversing the accumulator as previously stated is identical to that detailed in the earlier patents. On this cycle the tri-armed crank 255 is also restored to normal position as we shall now see. As the cam finger 194 moves clockwise on the first half of the cycle, pressure is exerted upon the middle arm 261 by the outside roller 260 to rock such tri-armed crank counterclockwise. As the crank 255 rises (Figs. 23 and 24) the ear 292 of its lower arm 258 wipes over the nose of latch 254 to be recaught on the shoulder 265. Latch 254 was restored to latching position through counterclockwise action of the tri-armed bail 250 occurring through the tension of its spring 259' with the restoration of the short cut key 173. The accumulator 81 subtracts on this cycle following the add cycle and continues subtracting with each successive cycle. When the machine has cycled the required number of times as indicated by the dial counter 145 the operator then removes his hand from the multiply lever 151 permitting it to restore to normal position at the end of the cycle. After the manual release of the multiply lever its restoration happens, as we know from earlier patents, upon the release of the multiply catch 165 by the cycling mechanism.

With the release of the multiply lever 151 to normal, pressure of its roller 179 is released from the motor crank lever 174. This action would ordinarily cause the motor to stop. The machine, nevertheless, continues to operate for an additional cycle due to pressure created by the extra cycle arm 180. After release of the multiply lever the extra cycle arm 180, locked under the division shaft lever extension 186 continues to bear down upon said motor crank lever 174 and thereby hold the motor contacts 293 closed for an extra cycle of operation.

On the forward stroke of the machine as it begins this extra cycle the cam finger 194 again descends clockwise, the inner roller 263 bears down on the division shaft lever 187 as before to raise the extended end 186 whereupon the extra cycle arm 180 is permitted to escape back to normal position. With this freeing of the extra cycle arm the motor crank lever 174 is spring drawn to normal thereby normalizing the extra cycle arm and causing the motor to stop at the end of the cycle.

With the release of the multiply lever to normal the print hammer bail blocking toe 71 is removed from the print hammer restoring bail rod 70 enabling such bail rod to move rearward on the extra cycle. This hammer bail rod 70 ordinarily moves rearward on the first half of each machine cycle unless blocked by the toe 71. In moving rearward the bail rod not only frees the print hammers 75 to effectively fire at the proper time, but also through the cam 80 on its right side, as described earlier, effects the engagement of the adding racks with the type racks to permit printing. Printing takes place at about the start of the return stroke of the machine cycle. The multiplicand is then printed on the right side and the short cut multiplier on the left side of the tally sheet. It will be noted that as the print hammers move rearward to strike the type, the positive hammer catch 274 which is still held in clockwise position blocks effective firing of the positive dial type hammer 279 while the negative hammer catch 273 in its disabled position permits firing of the negative hammer 150 to strike the type 148 on the negative side of the dial type rack 146.

After printing is effected on this extra cycle the machine backspaces and thereby unlatches the subtract setting mechanism and permits the hammer catch shaft 269 to restore to normal. With the restoration of the multiply lever 151 and the consequent rearward movement of the long link 154 the auxiliary latch 189 is thereby disabled permitting the backspace lever 191 to spring to backspace position against the backspace shaft arm 193. The long backspace latch 188 at this time is held disabled by the catch 196. This catch is rocked rearward by the cam finger 194 on the first half of each machine cycle. Now, on the first half of this extra cycle the finger cam 194 presses the backspace lever 191 down and as it moves over it the cam finger 194 backs the catch 196 rearward to release the long latch 188 to normal position, which release however occurs shortly after the backspace lever 191 is able to spring back to operative backspace position. On the return portion of th cycle the cam 194 acts upon the backspace lever 191. Backspacing as we know then takes place and the pin carriage 50 is backed one step to position for the next digit of the multiplier.

In the backspacing operation the backspace cross shaft 294 is rocked clockwise by the backspace arm 193. Fast on the right side of the machine (Fig. 1) in upright position on shaft 294 is a question mark-like lever 295 which turns with shaft 294 to push, by its nose 296, the latch 283 off the pin 281 of the hammer catch shaft arm 280. The hammer catch shaft 269 thereupon rocks counterclockwise to normal position and in doing so reverses to normal the positions of the negative catch 273 and the positive hammer catch 274. With this movement of shaft 269 the subtract setting lever 275 drops as it turns with the hammer catch shaft and releases its upward pressure from the subtract operating bail arm 277, the latter, under spring tension, being drawn down to normal position. Release of the subtract setting lever lowers the subtract yield arm 278 which as we know will set the reversing mechanism to restore the accumulator to positive position on the next cycle of the machine.

Above we have gone through a complete short cut operation of the machine for a short cut digit multiplier. Now, if the next digit of the multiplier is another digit in excess of 5 calling for short cut multiplication, the short cut key is again depressed and the machine operates again as described. If, however the next multiplier digit is a 5 or under, the short cut key is not depressed, but the multiplication lever is pushed rearward for a regular multiplication operation.

After the machine has cycled the extra cycle for the final digit of the multiplier the machine automatically blank strokes, totals, prints the product and clears the machine. Such automatic totaling mechanism is explained briefly above under regular multiplication and is detailed in the U. S. Patent No. 2,688,439.

Discount multiplication

Referring back to the general description of the steps involved in the performing of discount multiplication it will be noted that after the invoice quantity has been entered into the pin carriage and properly indexed the first function of the machine is to print such pin carriage entry, add it into the accumulator, and then backspace the pin carriage one step.

The mechanism for performing this first function will now be described. It is the same mechanism used for decimal printing, and is identical to that contained in U. S. Patent No. 2,688,439 with the exception that suitable linkage has been added to control the backspace mechanism and thereby permit the required backspace operation on the add cycle.

Figure 26:
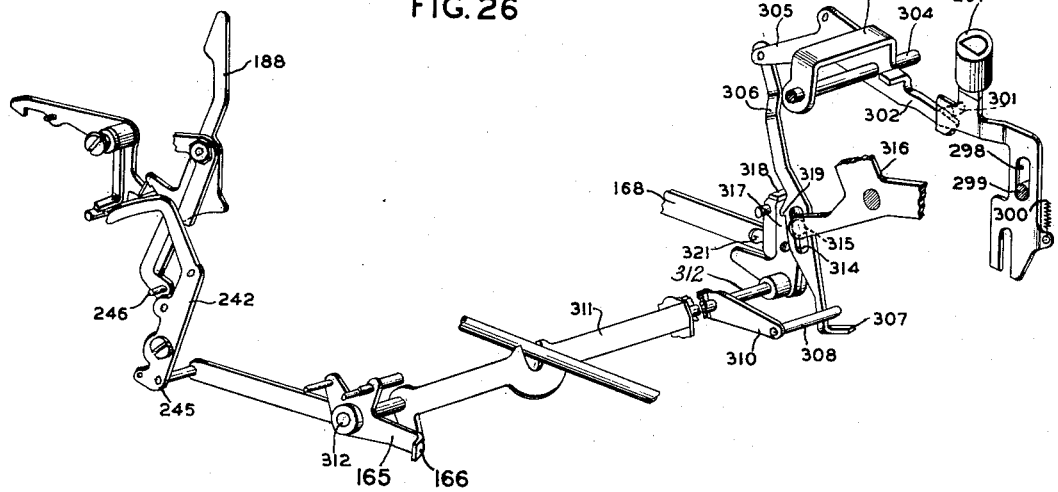
Fig. 26 is a perspective view of the discount mechanism in detail.

Referring now to Figs. 1 and 26, there is shown on the right side of the machine a D key 297, so called as it represents both the discount and decimal mechanisms. This key is guided for vertical slidable movement by a slot 298 on a fixed stud 299 and is tensioned constantly upwards to normal position by a spring 300. A roller 301 of the D key overlies an arm 302 of a bail 303 pivoted on the subtraction shaft 304. Pivoted on a rearwardly extending arm 305 of bail 303 is a downwardly extending slotted link 306. This link has at its lower end an ear 307 underlying a pin 308. This pin is fast to an arm 310 of a cross link 311 pivoted on the multiply latch cross shaft 312. Cross link 311 is linked on the left side of the machine to the short extended arm 245 of the backspace latch blocking arm 242 which latter arm when pressed rearward against the pin 246 will disable the long latch 188. It is, therefore, plain that depression of the D key 297 will, through the linkage described, rock the backspace blocking arm 242 rearwards to disable and hold disabled by the pin 246 the long backspace latch 188. Disabling of this latch 188 releases the backspace lever 191 which springs clockwise to backspace position where it will effect a backspace movement of the pin carriage on the subsequent cycling of the machine.

In link 306 there is a slot 314 through which extends a stud 315 fixed to the motor operating crank 316. Upon the raising of link 306, on depression of the D key, the crank 316 is rocked counterclockwise (Fig. 1) which action is communicated through appropriate linkage to close the motor contact 293 and start the motor.

Since after its depression the D key is immediately tensioned by its spring 300 back to normal position, means are provided to keep link 306 in operative position until the machine cycle is completed. Such means as we shall now see serves to prevent stopping of the motor and holds the long back space latch 188 in disabled position until the completion of the machine cycle. Still referring to Figs. 1 and 26 there is shown a lever 317 on the right side of the machine pivoted on the multiply latch cross shaft 312 and spring tensioned in a counterclockwise direction (Fig. 1) with an ear 318 limiting above a nose 319 of the slotted link 306. When the slotted link is raised by actuation of the D key the nose 319 wipes above the ear 318 which ear thereupon moves under the nose and holds link 306 locked in raised position. With this action a stud 320 on lever 317 (Fig. 1) is positioned toward the left end of a slot 321 in the long rearwardly extending link 168. This link 168 is connected (Fig. 1a) to the motor contact breaker arm 322 which arm is rocked counterclockwise to open the motor contacts 293 once with each machine cycle through pressure exerted on such breaker arm by a nose 330 of the motor cam plate 169. The motor contact breaker arm 322 serves to open the motor contacts and stop the motor. It is plain that with the rocking of the motor contact breaker arm the long link 168 will be pulled rearwards to disable the lock lever 317 permitting the slotted link 306 and the parts operated thereby to restore to normal.

Now, when the machine cycles after the discount key is depressed the invoice quantity as entered into the pin carriage is first printed, after which the machine adds such quantity into the accumulator and then backspaces by action of the finger cam 194 on the backspace lever 191.

The second function required of the machine in performing discount multiplication is to perform multiple subtractions from this accumulated figure. In this operation the percentage discount is used as a multiplier and determines the number of subtractions to be made. In performing this function the regular multiply mechanism is employed concurrently with the subtract mechanism. There is no need to describe here the regular multiplication mechanism, it having been sufficiently described above, and is more detailed in U. S. Patent No. 2,688,439. The subtract mechanism employed herein is also identical with that detailed in said Patent 2,688,439 except for several innovations which are necessary to enable the operation desired herein, the difference being that depressing of the subtract key in the machine of this application does not start the motor, and such key remains depressed during the discount multiply operations until automatically released with the full restoration of the pin carriage.

In describing the subtract mechanism as required for the second function of the machine in discount multiplication, reference is directed now to Figs. 1, 5 and 7 wherein is shown a subtract key 323 which pivots on an arm of the subtract operating bail 325. The subtract operating bail 325 pivots on the subtract shaft 304. Depressing the subtract key raises a subtract block arm 326 of the bail 325. The function of this subtract block arm is detailed in Patent No. 2,255,622. The subtract operating bail 325 also serves to raise by appropriate means disclosed in detail in U. S. Patent No. 2,688,439 the subtract yield arm 278 (Fig. 25) the function of which as detailed in Patent No. 2,203,336, is to actuate the accumulator reversing mechanism generally indicated by the numeral 262. Raising the yield arm 278 will cause the accumulator 81 to revolve to subtract position on the next cycle of the machine.

The subtract block arm 326, as we know, normally serves to hold the subtract mechanism locked for a full cycle of the machine. In order to hold the subtract mechanism locked for repeated cycles of the machine with the multiply key 151 pushed rearward the following novel mechanism has been incorporated into the present machine. On the block arm 326 there is a pin 284. The subtract latch lever 283 pivoted on a stud 282 on the right side of the machine tends to rotate in a clockwise direction but is restrained in such movement by its short fingered latch arm 327 limiting against the block arm pin 284. It will be seen that upon depression of the subtract key 323 and the consequent raising of the block arm 326 the pin 284 is raised above the shoulder 328 of the subtract short latch arm 327, whereupon such latch 327 falls clockwise positioning the fingered shoulder 328 beneath the subtract block pin 284 and thereby locking the subtract mechanism in operative position until released later with the restoration of the pin carriage.

The machine contains the conventional carriage restoring mechanism such as is detailed in Patent No. 2,229,980, and so much thereof as is necessary to show how the subtract latch is released will now be described, reference being made to Figs. 1, 6 and 7.

Operatively connected by appropriate linkage to the pin carriage 50 is a longitudinally extending shaft 331. Pinned to this shaft is a beveled gear 332 which meshes with a bevel gear sector 333 of a short cross shaft 334. On the right end of this cross shaft is fixed a short arm 335 to which is attached a roller 336. This roller lies slightly beneath a finger 337 extending from the lower end of the subtract latch 283. As the carriage is moved leftward this movement is communicated through the gearing described to rock the short arm 335 clockwise away from the subtract latch finger 337. On the restoration of the carriage 50 in conventional manner through action of the carriage restoring arm 164 the short arm 335 is rocked counterclockwise to a position slightly beyond its normal position or to its overthrow position and then drops back slightly as the pin carriage backs up slightly to its normal position. When the short arm 335 is rocked to its overthrow position the roller 336 contacts and rocks the subtract latch finger 337 counterclockwise which thereupon releases the subtract block arm 326 and thereby permits the subtract key 323 and subtract yield arm 278 to restore to normal. When the subtract yield arm is lowered to normal position it conditions the cradle reversing mechanism 262, as we know, to revolve the accumulator wheels from subtract to positive position.

Now, having described the subtract mechanism in relation to discount multiplication we are ready to proceed with the operation of the machine in performing its second function. If we go back it will be recalled that the second function of the machine in discount multiplication is to perform multiple subtractions from the figure added into the accumulator, and in performing this function the subtract mechanism is employed concurrently with the multiply mechanism. In initiating the second function the subtract key 323 is now depressed. This, as related above, raises the subtract yield arm 278 to condition the accumulator reversing mechanism 262 to revolve the accumulator wheels 67 to subtract position on the following machine cycle. The subtract key also actuates the subtract latch 283 to latch the subtract mechanism in subtract position until such latch is released on restoration of the pin carriage.

With the subtract key latched in depressed position the multiply lever 151 is next pushed rearward as in regular multiplication and is held there for the proper number of cycles as required for each digit of the multiplier which in this case is the percentage discount figure. The operations of the machine follow as in regular multiplication except that on the first cycle the accumulator wheels 67 are revolved to subtract position, and instead of adding on this and subsequent cycles the machine subtracts. With the final multiplier printing operation the stop carriage 50 as is known, restores to normal position at the right side of the machine. As explained above such restoring action releases the subtract latch 283 and thereby permits the subtract key 323 to spring to normal. With this action of the subtract key the subtract yield arm 278 is lowered to its normal position which action, as is known, conditions the cradle reversing mechanism 262 to restore the accumulator wheels 67 to positive position on the next cycle of the machine which will be a blank stroke cycle.

The machine does not stop with the restoration of the pin carriage, but continues by the same means as in regular multiplication to automatically blank stroke and total, as fully detailed in U. S. Patent No. 2,688,439. On the totaling operation the machine prints the final result and restores to normal position.

The decimal indicating mechanism may be positioned to indicate the decimal position in the final result. The D key 297 may then be pressed which actuates the decimal printing mechanism to print the decimal point. The decimal indicating and printing mechanism is identical to that contained in U. S. Patent No. 2,688,439 and need not be described.

*Constant multiplicand mechanism*

There is incorporated in the machine a constant multiplicand assembly. It is used in conjunction with the space stops 54 in the setting up of a constant multiplicand reference being made to Figs. 5, 6, 11, 27, 28 and 29. In problems where the same multiplicand appears, but with different multipliers, the constant multiplicand feature permits the multiplicand to be multiplied by the several multipliers without the necessity of setting up the same multiplicand for each problem. For example, in the problems where the multiplicand 49675 is to be multiplied by the respective multipliers 125, 176, and 185, the multiplicand is set up once, through use of the feature about to be described, instead of several times as would otherwise be required.

Where the constant assembly is used in setting up the multiplicand the mechanism employed and the operation of such proceeds as follows. The number of digits in the multiplicand plus those of one of the multipliers, less one is first determined, which in the above example would be "7." This number subtracted from 13, the number of stops 51 in each transverse row of the stop carriage, leaves 6. In setting up the multiplicand the cipher key 339 is depressed six times to move the pin carriage 50 leftward 6 spaces. Then the multiplicand 49675 is entered into the carriage, which moves the carriage leftward five more spaces or a total of 11. The space key 56 is next depressed. With the space key held in depressed condition the constant key 340 is depressed. When the constant key 340 is depressed, a pin 341 on its stem will engage the cam shaped upper end of a bellcrank 375 pivoted at 376. The other end of the bell crank 375, in lifting, engages a cam surface of a universal stop bar 377 and moves it to the left to allow the universal bar 95 to be moved downward by further movement of the shoulder 342 of the stem of key 340. The bar 95, thus lowered releases the dogs 343 of the conventional escapement mechanism 58 from the pin carriage and permits the pin carriage to freely travel leftward across the machine. In this case it travels the two remaining spaces. As the pin carriage travels leftward the depressed space key 56 automatically sets the remaining two space stops. To insure free traveling of the pin carriage against possible release of the constant key, depressing the constant key actuates latching means designated generally 344 and positioned on the key board lower plate 88 to latch both the constant key and the space key until the pin carriage has completed its journey leftward. Briefly, this latching means comprises pins 352 on the stems of the respective "space" and "constant" keys 56 and 340. As the stems are depressed, these pins cam arms 353 to the right. These arms 353 are pivoted at 354 and urged to the left by springs 355. These arms 353 have lateral fingers 356 which are engaged by the pins 352 and cammed to the right until, when the pins 352 pass below the fingers 356, the springs 355 pull the fingers and the arms to the left to place the fingers over the pins and thereby hold the key stems down. The free ends of arms 353 are connected by pins 357 thereon, riding in slots 358, to a link 359. The link 359 is provided with a slot 360 associated with a fixed pin 361 extending therethrough. The other end of link 359 has another slot 362 therein through which extends a fixed pin 363. When the pin carriage has traveled to the left of the machine it strikes an arm 345 which actuates the link 359 to release the space key and constant key to normal. This arm 345, as shown, is the upper end of a pivoted lever the lower end of which is engaged by the carriage in left end position to swing the upper end to the right and move link 359 to the right thus removing fingers 356 from above the pins 352 and allowing the keys 56 and 340 to spring up to normal.

After the multiplicand has been thus set a constant latch lever 346 at the right side of the machine is manually pulled forward where it is latched by suitable means 347. Movement of the latch lever 346 forward as viewed in Fig. 28, or counterclockwise as viewed in Fig. 29, will rock its shaft 364 to lower a cam 365 and permit the spring 367 to draw down the restoring plate 348 and its stem 366 which rests on the cam 365. This plate 348 is the conventional pin carriage restoring plate, and thus lowered, it is out of the path of the pin stops so that the restoration of the pin carriage does not restore the stops which have been set up. With the constant latch lever 346 latched the machine is operated as in regular multiplication for the first problem. Upon completion of the first problem the pin carriage restores but the stops 51 do not restore. The multiplicand previously entered into the pin carriage remains therein as long as the constant latch lever 346 is held in forward position. For the second problem the constant key is again depressed causing the pin carriage 50 to travel again to the left with its constant multiplicand, and the machine is then operated again as in regular multiplication. When the latch lever 346 (Fig. 29) is moved counterclockwise, a pin 368 on an arm 364' attached to its sleeve 368' fixed on shaft 364 will ride along a cam surface 369 and lie behind a shoulder 370 on pivoted lever 371. The other end of lever 371 has a pin 372 riding loosely in a slot 373 on one end of another pivoted lever 374, the other end of which supports a roller 351. From Fig. 29 it will be clear that if roller 351 is lifted, this action will release pin 368 and the latch lever 346 by spring means (not shown) will restore to normal and will rotate the cam 365 and lift the plate 348. This roller 351 is lifted by a cam link 350 which is attached to the right end of the backspace key 349 and when moved to the right will cam the roller 351 up. This action will enable restoration of the stop pins 51 to normal.

While I have described what I consider to be a highly desirable embodiment of my invention, it is obvious that many changes in form could be made without departing from the spirit of my invention and I therefore do not limit myself to the exact form herein shown and described nor to anything less than the whole of my invention as herein set forth and as hereinafter claimed.

What I claim is:

1. In a printing calculating machine of the type described whereon problems in multiplication may be executed in a short cut manner; the combination with main operating mechanism of an accumulator settable for addition and subtraction, actuating mechanism for such accumulator, a movable stop carriage for controlling the accumulator actuating mechanism, a short cut multiplication conditioning key, mechanism operable by such short cut key for indexing such stop carriage a space leftward to its next higher order value, means for automatically latching such key in depressed position, means settable by such key in its depressed position for conditioning such accumulator for an add operation on the cycling of the main operating mechanism, backspacing mechanism, means conditioned by the depression of such key for causing such backspacing mechanism to backspace the stop carriage on such add operation cycle, means set by the short cut key in its operative position for conditioning the accumulator to perform repeated subtract operations on cycles of the main operating mechanism subsequent to such backspace add operation, means affected by such backspace operation to disable the short cut key latching means and thereby to restore the short cut key to normal position, a manually operable member controlling means for giving the main operating mechanism such repeated cycles of operation, means operable by the main operating mechanism for recording in a positive and in a complementary manner the number of cycles of operation of the main operating mechanism, means settable by the short cut key in depressed position determining such recording means to record the ten's complement of the positive number of cycles of operation of the main operating mechanism, means operable upon release of the manually operable member to normal position to cause the backspace mechanism to backspace the stop carriage, and means operable by such backspace operation to reset the accumulator for positive accumulations.

2. The combination, in a calculating machine of the character described wherein discount multiplication may be executed, of an accumulator settable for addition and subtraction, a movable pin carriage, key means for entering a numerical quantity into the pin carriage, differential actuators to transfer values from the carriage to the accumulator, a discount key, main operating mechanism operable upon depression of the discount key to cause such numerical quantity to be added into the accumulator by said actuators, backspace mechanism settable upon depression of the discount key and automatically operable by the main operating mechanism subsequent to such accumulator entry to backspace the pin carriage one space, a subtract key, means operable by depression of the subtract key to set the accumulator for subtract operations, latching means automatically operable upon depression of the subtract key to latch it in operative position, means for controlling repeated cyclic operation of the main operating mechanism, while the subtract key is latched in operative position whereby the quantity contained in the carriage is repeatedly subtracted from that contained in the register, said last named means including a manually positionable control member, carriage restoring means operable by the main operating mechanism upon the last of said repeat cycles and determined by release of said control member, and means operable by the carriage restoring means for releasing the subtract key latching means.

3. In a printing calculating machine of the type described whereon problems in multiplication may be executed in a short cut manner; the combination with main operating mechanism of an accumulator settable for addition and subtraction, actuating means for such accumulator, a movable stop carriage for controlling the accumulator actuating means, means for setting the accumulator for addition or subtraction, a short cut multiplication conditioning key, mechanism operable by such short cut key for indexing such stop carriage a space leftward to its next higher order value, means for automatically latching such key in its operative position, means settable by said short cut key for conditioning said accumulator setting means to set the accumulator for an add operation on the first cycle of the main operating mechanism, backspacing mechanism, means conditioned by the actuation of the short cut key for causing such backspacing mechanism to backspace the stop carriage on such add operation cycle, means set by the short cut key and operable by the main operating mechanism subsequent to the operation of the backspacing mechanism to condition said accumulator setting means for subtraction, means for latching said last named means in operated condition during plural cycles of the main operating mechanism subsequent to said add cycle, means operable by said backspace mechanism to disable the short cut key latching means and restore the short cut key to inoperative position, a manually operable member, means controlled by said member to cause repeated cyclic operation of said main operating mechanism, means automatically operable by the main operating mechanism on the completion of such repeated subtract cycles of operation upon release of said manually operated member, to operate said backspace mechanism to release the means for setting the accumulator for subtraction to automatically condition said accumulator setting means to set the accumulator for positive accumulations.

4. The invention of claim 3 further characterized in that there is means automatically operable by the main operating mechanism after the final entry into the accumulator to total and print the product contained in the accumulator.

5. In a printing calculator whereon problems in shortcut multiplication may be executed, the combination with main operating mechanism, of an accumulator reversible for addition and subtraction, a movable stop carriage, means for entering a numerical value into said carriage, differential actuators for entering numerical values into the accumulator from said stop carriage, means for backspacing the stop carriage, means for reversing the accumulator for addition or subtraction, a manually operable member to activate the main operating mechanism, preset means manually operable before the manually operable member is operated; to step the carriage one space to the left, to condition the main operating mechanism to actuate the reversing means to set the accumulator for addition so as to add the numerical value in the carriage into the accumulator on the first cycle of operation, to condition the accumulator reversing means to set the accumulator for subtraction on subsequent cycles, and to condition the backspacing means to backspace the carriage on the first cycle and the last cycle, and means operated by the manually operable member to initiate the operation of the main operating mechanism to make effective the several previously conditioned means to add and backspace on the first cycle, to subtract on subsequent cycles, and to backspace on the last subtract cycle.

6. In a printing calculator whereon problems in multiplication may be executed in a short cut manner and having a movable stop pin carriage, an accumulator reversible for addition and subtraction, means for entering values from the carriage into the accumulator, means for reversing the accumulator for addition and subtraction, means for backspacing the carriage, and a main operating mechanism, the combination of a manually operable member, means to activate said main operating mechanism, preset means manually operable before the manually operable member is operated; to step the carriage one space to the left, to condition the main operating mechanism to actuate the reversing means to set the accumulator for addition to add a numerical value into the accumulator on the first cycle of operation, to condition the accumulator reversing means to set the accumulator for subtraction on subsequent cycles and to set the accumulator for addition after the last subtract cycle when the manually operable member is released, to condition the backspacing means to backspace the carriage on the first cycle and the last cycle, means operated by the manually operable member to initiate the operation of the main operating mechanism to make effective the several previously conditioned means to add the increased value into the accumulator on the first cycle, to backspace the carriage during the first cycle, to reverse the accumulator to subtract position and to subtract values from the accumulator on subsequent cycles and to backspace the carriage on the last subtract cycle, to restore the accumulator for addition when the selectively operable means is released, and means automatically operable by the main operating mechanism after said release to total and print the product contained in the accumulator.

References Cited in the file of this patent

UNITED STATES PATENTS

| | | |
|---|---|---|
| 902,125 | Wales | Oct. 27, 1908 |
| 936,652 | McFarland | Oct. 12, 1909 |
| 978,168 | Kilpatrick | Dec. 13, 1910 |
| 1,033,109 | Lundgren | July 23, 1912 |
| 1,180,556 | Wetmore | Apr. 25, 1916 |
| 1,205,481 | Rechnitzer | Nov. 21, 1916 |
| 1,247,670 | Greve | Nov. 27, 1917 |
| 1,580,858 | Schluns | Apr. 13, 1926 |
| 1,813,037 | Ens | July 7, 1931 |
| 2,203,336 | Landsiedel | June 4, 1940 |
| 2,237,881 | Landsiedel | Apr. 8, 1941 |
| 2,255,622 | Landsiedel | Sept. 9, 1941 |
| 2,374,333 | Crosman | Apr. 24, 1945 |
| 2,397,745 | Kiel | Apr. 2, 1946 |
| 2,424,359 | Liljestrom | July 22, 1947 |

FOREIGN PATENTS

| | | |
|---|---|---|
| 470,339 | Germany | Jan. 11, 1929 |

OTHER REFERENCES

Serial No. 262,552, Kiel (A. P. C.), published May 25, 1943.